(12) United States Patent
Alder

(10) Patent No.: US 9,446,656 B2
(45) Date of Patent: Sep. 20, 2016

(54) COVERING APPARATUS FOR OPEN-TOPPED CONTAINERS

(71) Applicant: Wastequip, LLC, Charlotte, NC (US)

(72) Inventor: Nicholas W. Alder, Charlotte, NC (US)

(73) Assignee: WASTEQUIP, LLC, Charlotte, NC (US)

( * ) Notice: Subject to any disclaimer, the term of this patent is extended or adjusted under 35 U.S.C. 154(b) by 0 days.

(21) Appl. No.: 14/261,661

(22) Filed: Apr. 25, 2014

(65) Prior Publication Data

US 2015/0307014 A1 Oct. 29, 2015

(51) Int. Cl.
B60J 7/08 (2006.01)

(52) U.S. Cl.
CPC .................. B60J 7/085 (2013.01)

(58) Field of Classification Search
CPC .. B62D 33/02; B62D 53/062; B62D 63/061; B62D 21/12; B62D 21/14; B62D 23/005; B62D 49/005; B62D 61/12; B62D 61/125; B62D 63/025; B62D 49/065; B62D 49/02; B66F 9/065; B66F 9/06; B66F 9/061; B66F 9/10; B66F 9/12; B66F 9/149
USPC ............. 296/183.2, 35.3, 26.08, 37.6, 26.07; 180/11, 900; 298/14, 22 P, 11, 12
See application file for complete search history.

(56) References Cited

U.S. PATENT DOCUMENTS

| | | | |
|---|---|---|---|
| 3,868,142 A | 2/1975 | Bachand et al. | |
| 5,031,955 A | 7/1991 | Searfoss | |
| 5,186,231 A * | 2/1993 | Lewis | B60J 7/068 160/264 |
| 5,752,735 A | 5/1998 | Fleming et al. | |
| 5,775,765 A * | 7/1998 | Kintz | B60J 7/085 160/23.1 |
| 5,806,911 A | 9/1998 | Haddad, Jr. | |
| 5,829,819 A | 11/1998 | Searfoss | |
| 5,944,374 A | 8/1999 | Searfoss | |
| 6,003,920 A | 12/1999 | Crisp | |
| 6,257,646 B1 * | 7/2001 | Searfoss | B60J 7/085 160/74 |
| 6,318,790 B1 | 11/2001 | Henning | |
| 6,637,800 B2 * | 10/2003 | Henning | B60J 7/085 296/100.14 |
| 6,659,531 B2 | 12/2003 | Searfoss | |
| 6,974,176 B2 | 12/2005 | Smith et al. | |
| 6,979,043 B2 * | 12/2005 | Leischner | B25B 13/48 296/98 |
| 7,111,891 B2 | 9/2006 | O'Brian et al. | |
| 7,275,780 B2 * | 10/2007 | Boyd | B60J 7/085 296/100.01 |
| 8,465,080 B2 | 6/2013 | Searfoss | |
| 8,534,742 B2 | 9/2013 | Schmeichel et al. | |
| 8,690,223 B2 | 4/2014 | Barley | |
| 8,752,881 B2 | 6/2014 | Chenowth | |

(Continued)

FOREIGN PATENT DOCUMENTS

WO  WO 2004/080742 A2  9/2004

*Primary Examiner* — Glenn Dayoan
*Assistant Examiner* — Sunsurraye Westbrook
(74) *Attorney, Agent, or Firm* — Nelson Mullins Riley & Scarborough LLP

(57) ABSTRACT

A spring-loaded covering apparatus. The covering apparatus can include a drive screw and a carriage threadably engaged with the drive screw. Rotation of the drive screw can affect translation of the carriage, such that the position of the carriage is adjustable along the length of the drive screw. Moreover, the carriage can include a spring, which can be attached to the extendable cover via a pivot arm. The cover can be wound onto a roller and, when a length of the cover is unwound from the roller, the spring can pivot the arm to pull the cover into an extended configuration.

17 Claims, 24 Drawing Sheets

(56) References Cited

U.S. PATENT DOCUMENTS

2002/0021018 A1* 2/2002 Royer ................... B60J 7/085
                                                          296/98

2007/0246435 A1* 10/2007 Crookston ............ B65G 21/14
                                                          212/264

\* cited by examiner

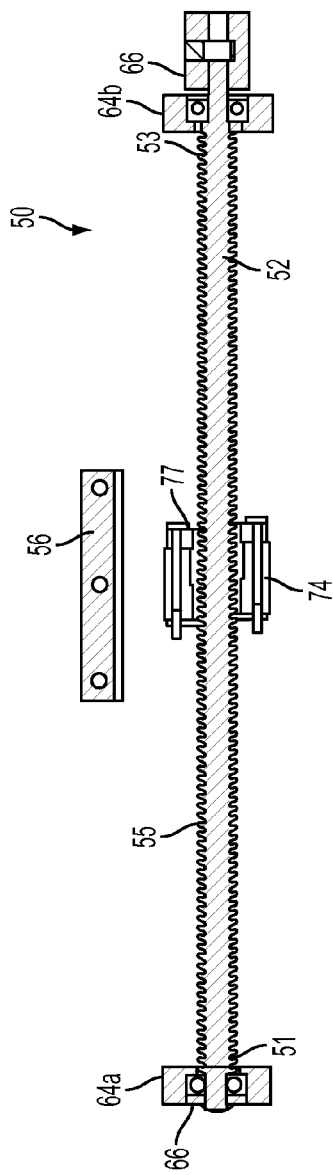
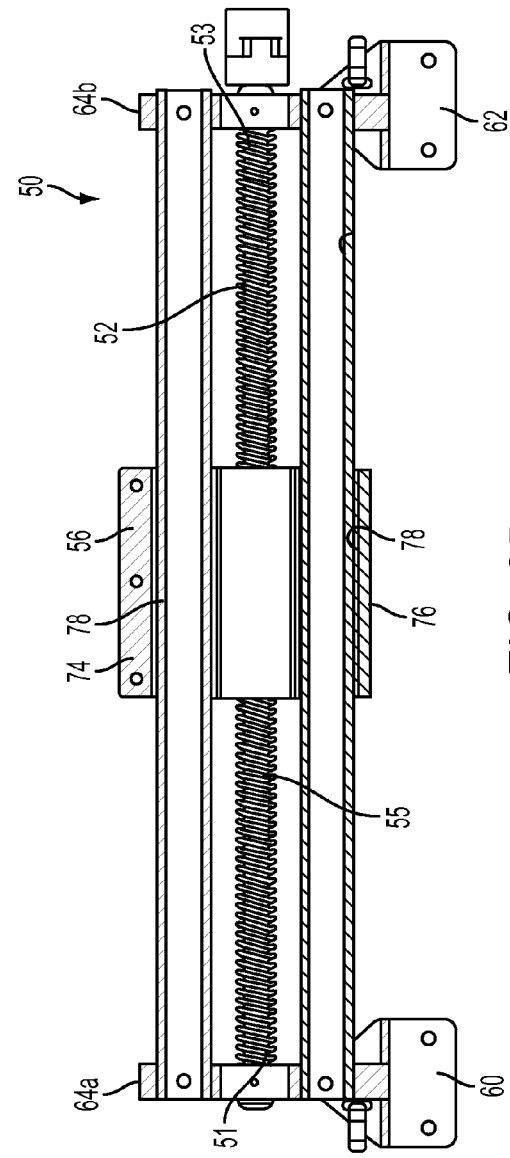
FIG. 24
FIG. 25

COVERING APPARATUS FOR OPEN-TOPPED CONTAINERS

FIELD

The present disclosure relates to apparatuses for covering and uncovering open-topped containers.

BACKGROUND

Many vehicles for hauling and/or storing various materials include open-topped containers. For example, semi-trailer trucks, dump trucks, and pickup trucks may include an open-topped container. The open-topped container of a vehicle can be loaded with a variety of material, such as waste materials, gravel, sand, dirt, mulch, stones, grains, produce and/or a combination thereof, for example. The open-topped container can be used to transport and/or store the loaded material. Depending upon the type of material(s) loaded into the open-topped container, it is often desirable to provide a cover for the container. Additionally, in certain jurisdictions and in certain instances, covering the open-topped container may be a legal requirement. Flexible covers or tarpaulins are frequently used to cover open-topped containers during storage and/or transit. Accordingly, it is desirable to provide a covering apparatus for open-topped containers that can operably position a cover over the open-topped container and can operably remove the cover from the open-topped container. Moreover, it is desirable to provide a covering apparatus that can be adjusted based on the dimensions of the container, the type of transportation vehicle, and/or the placement of the covering apparatus relative to the container and/or the vehicle.

The foregoing discussion is intended only to illustrate various aspects of the related art in the field of the invention at the time and should not be taken as a disavowal of claim scope.

DESCRIPTION OF THE FIGURES

The features and advantages of this invention and the manner of attaining them will become more apparent and the invention itself will be better understood by reference to the following description of embodiments of the invention taken in conjunction with the accompanying drawings:

FIG. 24 is a cross-sectional elevation view of the covering apparatus of FIG. 15 taken along plane C-C in FIG. 16 and with various elements removed therefrom, according to various embodiments of the present disclosure.

FIG. 25 is a cross-sectional elevation view of the covering apparatus of FIG. 15 taken along plane D-D in FIG. 16 and with various elements removed therefrom, according to various embodiments of the present disclosure.

DETAILED DESCRIPTION

Figure 1:
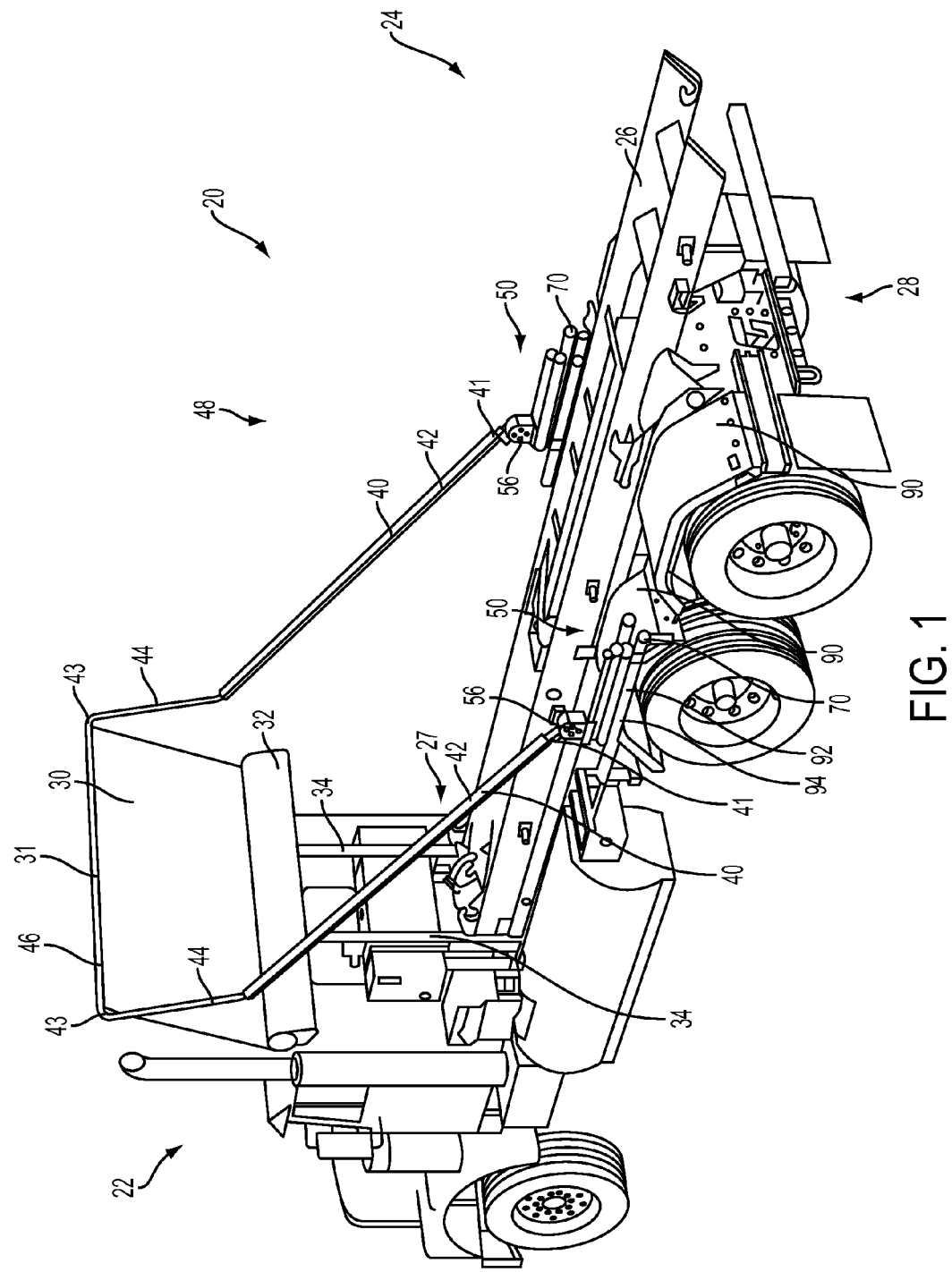
FIG. 1 is a perspective view of a truck having a cab and a trailer chassis, depicting a covering apparatus mounted to the trailer chassis, and further depicting the covering apparatus in a first configuration, according to various embodiments of the present disclosure.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the present invention.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Additionally, reference throughout the specification to "various instances," "some instances," "one instance," or "an instance", the like, means that a particular feature, structure, or characteristic described in connection with the instance is included in at least one instance. Thus, appearances of the phrases "in various instances," "in some instances," "in one instance", "in an instance", or the like, in places throughout the specification are not necessarily all referring to the same instance. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

Referring to FIGS. 1-14, a vehicle 20 can include a cab 22 and a trailer frame or chassis 24. In certain embodiments, the cab 22 and the trailer chassis 24 can be integrally formed and, in other embodiments, the trailer chassis 24 can be attached and/or hitched to the cab 22, for example. The chassis 24 can further include a bed or flat 26, which can be configured to support a container, such as the open-topped container 25 (FIGS. 10, 13 and 14), for example. In certain embodiments, different size containers can be compatible with the vehicle 20. For example, an open-topped container having a first length can be transported by the vehicle 20, and then an open-topped container having a second, different length can be transported by the vehicle 20. The reader will appreciate that containers of different widths, heights, volumes and/or various different dimensions and capacities can be loaded onto the bed 26 and transported by the vehicle 20.

Though a particular vehicle is depicted in FIGS. 1-14, the reader will appreciate that the covering apparatuses and/or actuators disclosed herein can be used with a variety of different types and sizes of vehicles. Moreover, the covering apparatuses disclosed herein can be used with a variety of different sizes and/or types of containers, including roll-off containers, lift-off containers, shipping containers and/or various intermodal containers, for example. The reader will further appreciate that the term open-topped container includes containers having fully open tops and containers having partially open tops. Furthermore, in various instances, the covering apparatus disclosed herein may be used with closed top containers, such that and the supplemental cover provides additional security and/or restraints for the container and the contents therein.

Referring still to FIGS. 1-14, the vehicle 20 can include a cover 30, which can be movably deployed and positioned over the top of a container. For example, when fully extended or deployed (FIGS. 7-9), the cover 30 can span the length of the container 25 (FIGS. 10, 13 and 14) and entirely cover the load retained within the container 25. The cover 30 can be wound onto a roller 32, which can be positioned at a first end 27 of the bed 26. In various embodiments, the roller 32 can be powered by a motor and/or can be spring-loaded, for example, to absorb slack in the cover 30 and/or maintain the tension therein.

For example, referring still to FIGS. 1-14, a motor assembly 36 having a motor 38 (FIGS. 10-14) can selectively wind and unwind the cover 30 around the roller 32. Motor arrangements for selecting extending and retracting covers are disclosed in U.S. Pat. No. 3,868,142 to Bachand et al., entitled ADJUSTABLE TRUCK COVER, which issued Feb. 25, 1975; U.S. Pat. No. 5,031,955 to Searfoss, entitled TRUCK COVER, which issued Jul. 16, 1991; and U.S. Pat. No. 5,829,819 to Searfoss, entitled ELECTRIC TARP SYSTEM FOR TRUCK BED, which issued Nov. 3, 1998, which are hereby incorporated by reference herein in their respective entireties. In various instances, the roller motor 38 can be operated to selectively cover and uncover an open-topped container and, in certain instances, can be operated from the cab 22 of the vehicle 20 and/or can be otherwise controlled remotely, for example.

Figure 10:
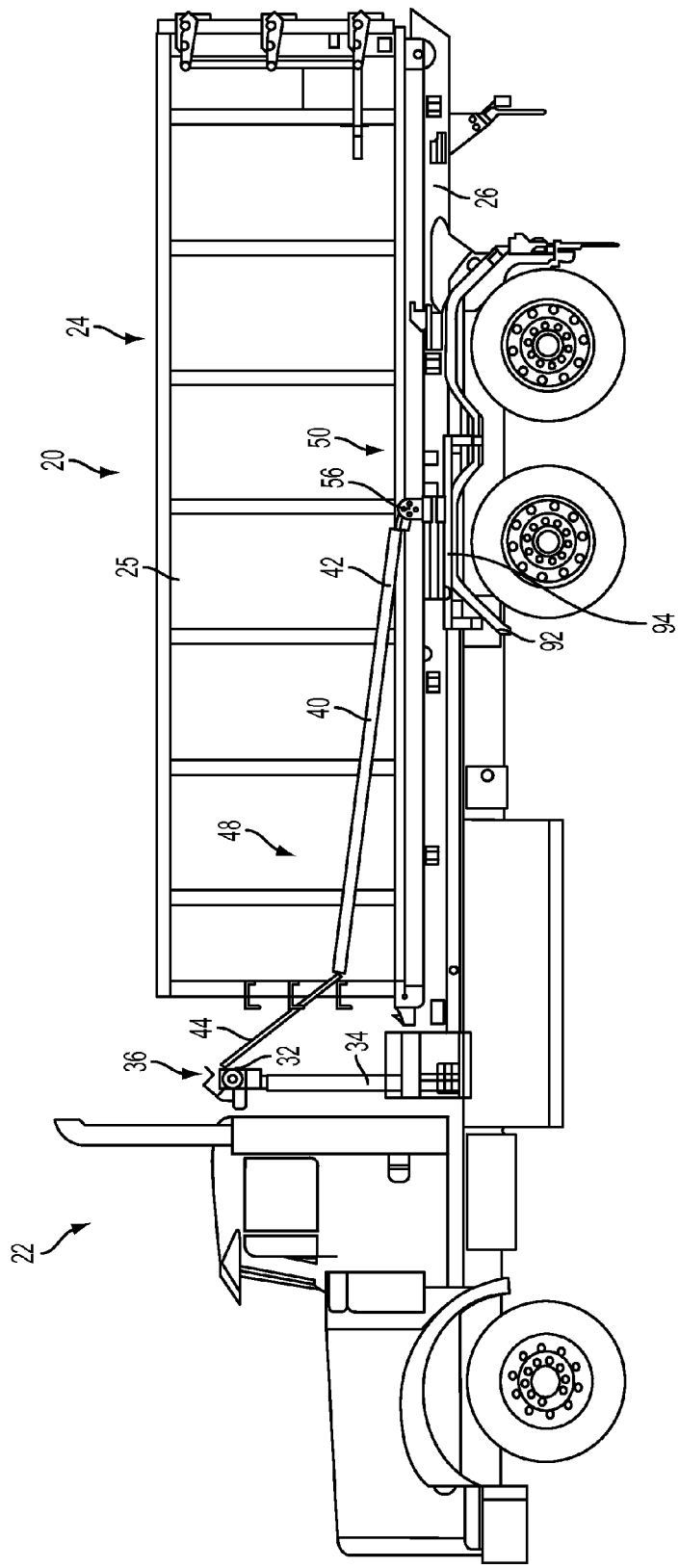
FIG. 10 is an elevation view of the truck and the covering apparatus of FIG. 1, depicting an open-topped container loaded onto the bed of the truck, and further depicting the covering apparatus in a retracted configuration, according to various embodiments of the present disclosure.
Figure 13:
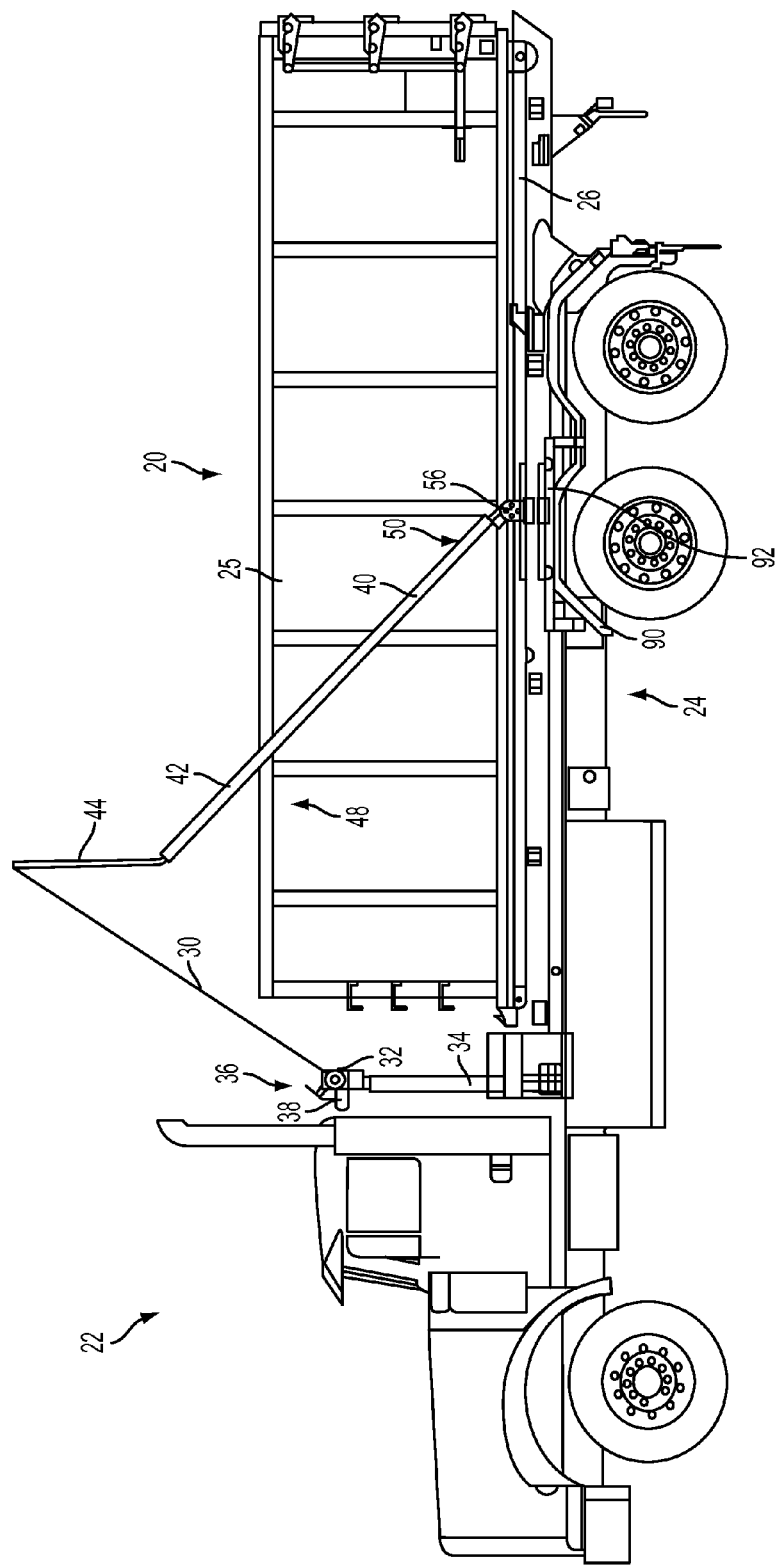
FIG. 13 is an elevation view of the truck and the covering apparatus of FIG. 1, depicting the cover roller supported by the support, and further depicting the support in a retracted configuration, according to various embodiments of the present disclosure.
Figure 14:
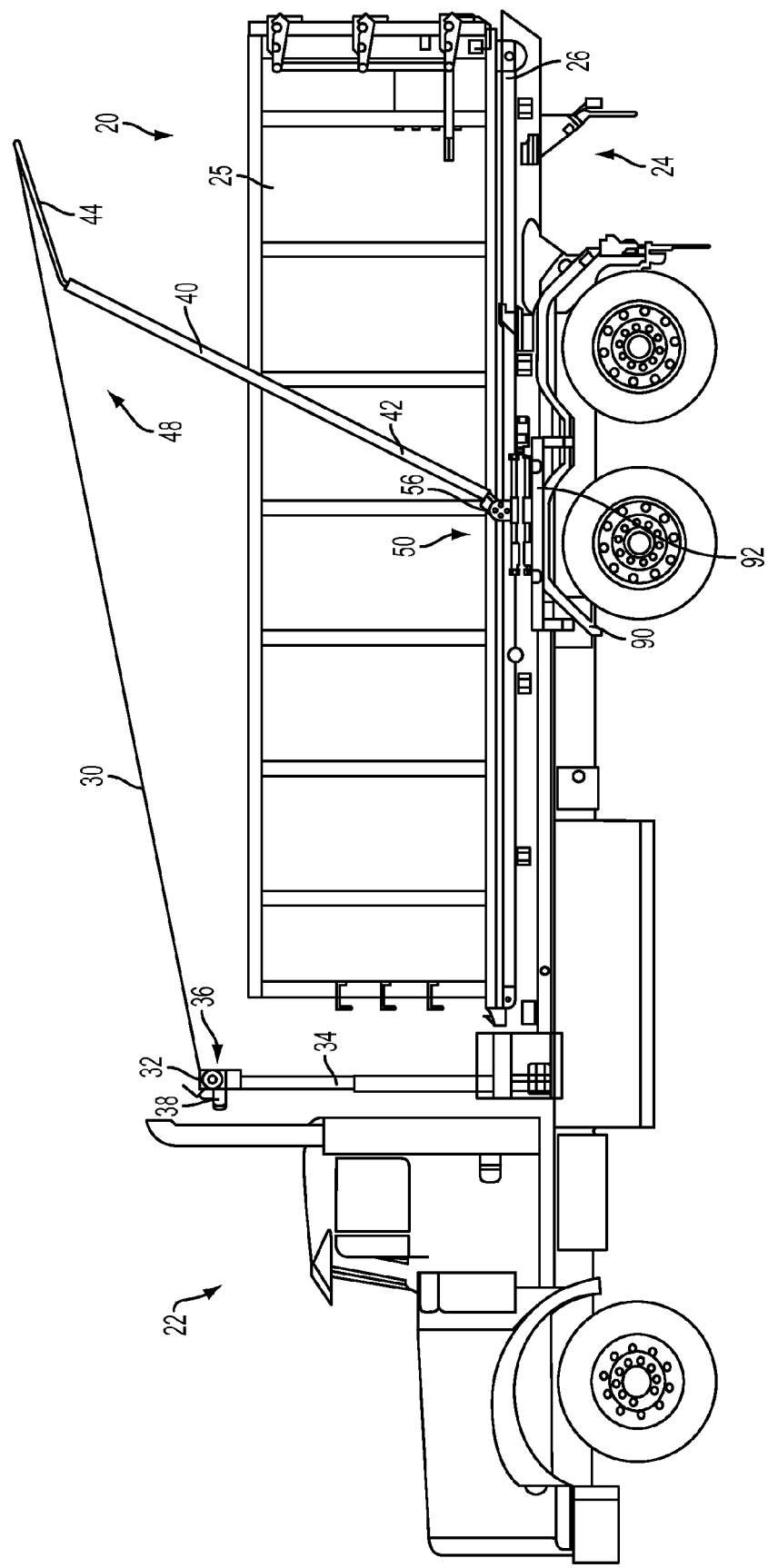
FIG. 14 is an elevation view of the truck and the covering apparatus of FIG. 13, depicting the support in an extended configuration, according to various embodiments of the present disclosure.
Figure 15:
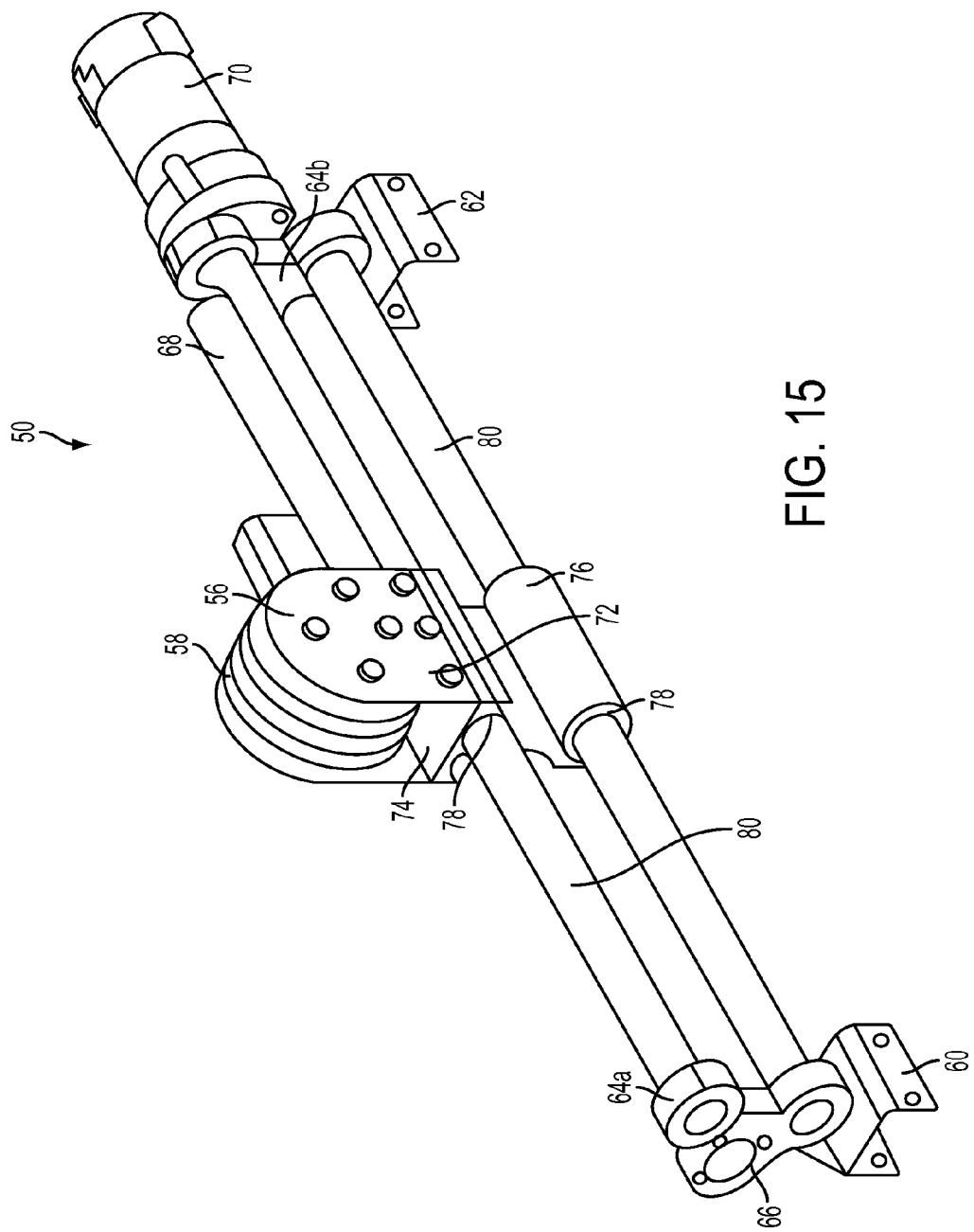
FIG. 15 is a perspective view of the covering apparatus of FIG. 1, according to various embodiments of the present disclosure.
Figure 16:
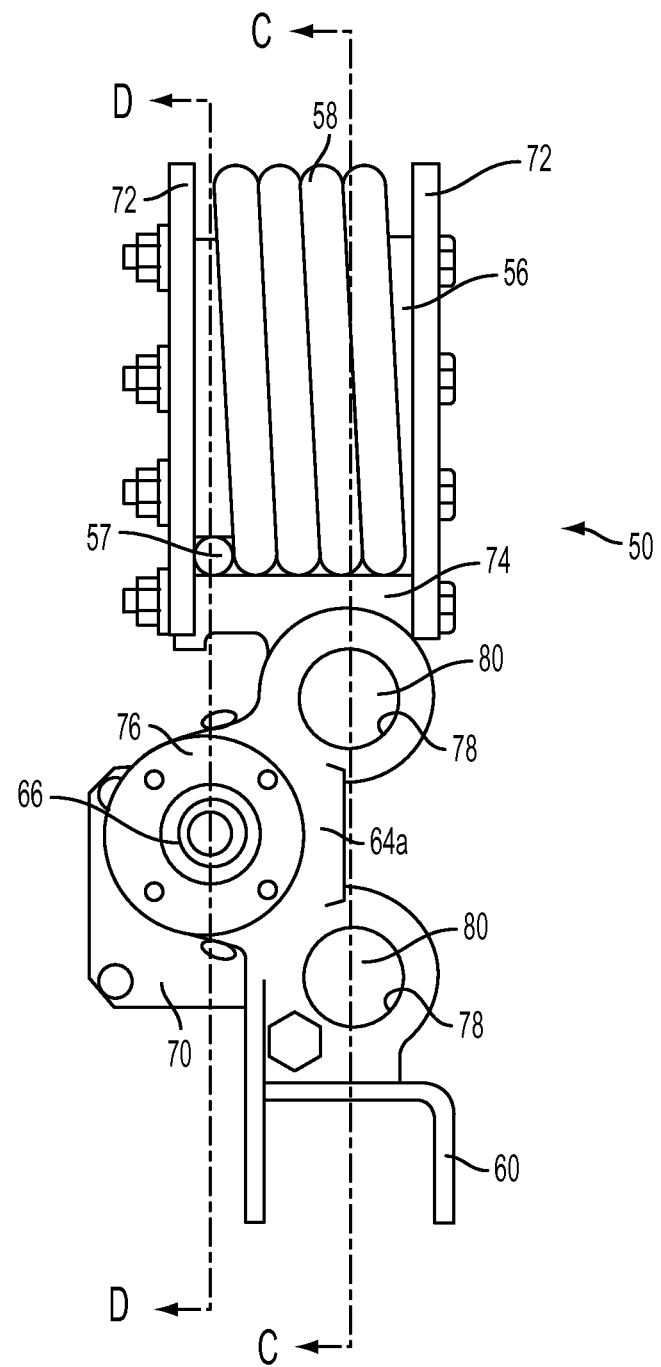
FIG. 16 is an elevation view of the covering apparatus of FIG. 15, according to various embodiments of the present disclosure.
Figure 17:
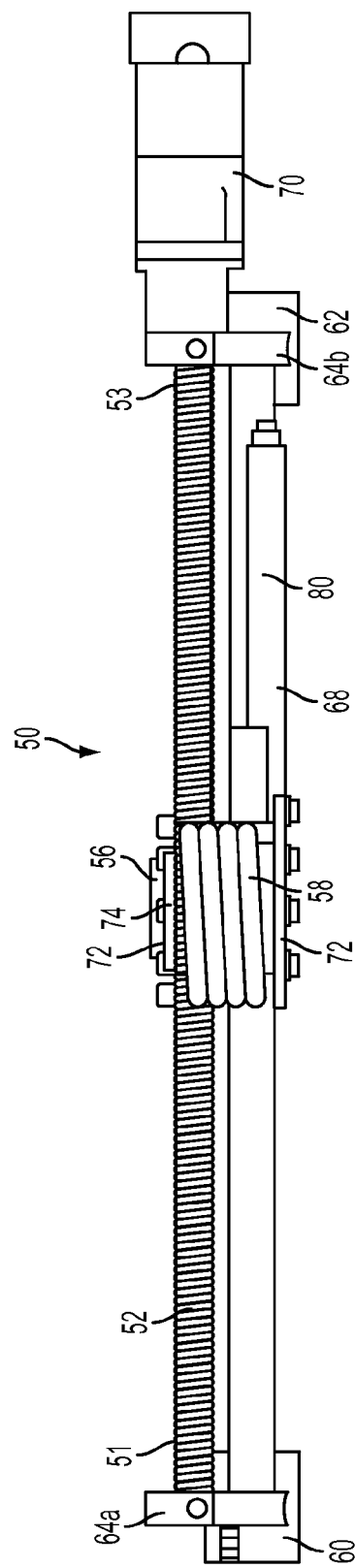
FIG. 17 is a plan view of the covering apparatus of FIG. 15, according to various embodiments of the present disclosure.

As described in greater detail herein, an extendable end 31 of the cover 30 can extend from the roller 32, for example, and can be biased and/or cover pulled away from the roller 32 by a spring, such as spring 58 (FIGS. 15-18), for example, described in greater detail herein. In such instances, as the roller 32 unwinds and releases a length of the cover 30, the spring 58 can pull the extendable end 31 of the cover 30 to extend the cover 30 while maintaining tension and/or tautness in the cover 30. Moreover, when the roller motor 38 rewinds the length of the cover 30 onto the roller 32, the force generated by the roller motor 38 can overcome the spring force, such that the spring 58 yields to the roller motor 38 and releases the length of the cover 30 toward and/or onto the roller 32, for example. In various embodiments, the cover or tarpaulin 30 can be formed of a flexible material such as polyester, polypropylene, vinyl, canvas, or other material suitable for retaining material within the open-topped container 25 (FIGS. 10, 13 and 14).

The reader will appreciate that various other materials can also be suitable for the cover 30.

In certain embodiments, the roller 32 can be mounted to a post or standard 34, which can extend from the bed 26 near the cab 22 of the vehicle 20. In various embodiments, two or more posts 34 can support the roller 32. Moreover, the post(s) 34 can be adjustable, such as the posts disclosed in U.S. Pat. No. 3,868,142 to Bachand et al., entitled ADJUSTABLE TRUCK COVER, which issued Feb. 25, 1975, and which is hereby incorporated by reference herein in its entirety. For example, the posts or supports 34 can be movable between an extended configuration and a retracted configuration, and can telescope and/or otherwise be configured to move between different lengths. In various instances, the height of the posts 34 relative to the chassis 24 and the corresponding height of the cover roller 32, can be selected based on the dimensions of the container 25 (FIGS. 10, 13 and 14) loaded onto the bed 26 of the chassis 24, for example. For example, referring primarily to FIGS. 13 and 14, the posts 34 can be moved between retracted or lowered position (FIG. 13) and an extended or lifted position (FIG. 14).

Referring still to FIGS. 1-14, a covering apparatus or actuator 50 can be configured to draw the cover 30 along at least a portion of the length of the bed 26. The covering apparatus 50 can be spring-loaded and motor-driven, for example, such that it is configured to extend the cover 30 via a spring force and mechanical displacement. For example, the covering apparatus 50 can pull the cover 30 such that it extends from the first end 27 of the bed 26 to the second end 28 of the bed 26. In various embodiments, as described in greater detail herein, the covering apparatus 50 can adjustably extend the cover 30 over the bed 26 such that the cover 30 securely covers the open-topped container 25 (FIGS. 10, 13 and 14).

In various embodiments, an arm 40 can extend between the covering apparatus 50 and the cover 30 and can connect the covering apparatus 50 to the cover 30. For example, the arm 40 can include a first end 41 and a second end 43, and the first end 41 can be coupled to the covering apparatus 50 and the second end 43 can be coupled to the cover 30, for example. In certain embodiments, a pair of arms 40 can extend on lateral sides of the vehicle 20, and can be connected by a transverse member 46 at and/or near the second end 43. For example, an arm assembly 48 can include a pair of arms 40 and a transverse member 46, which can form a U-shaped arm assembly 48, for example. The cover 30 can be attached to the transverse member 46, which can pull the cover 30 toward the second end 28 of the bed 26 via the pair of arms 40 positioned on opposite sides of the chassis 24 and of the container 25 (FIGS. 10, 13 and 14), for example.

In various embodiments, the arm 40 can include a first portion 42 and a second portion 44. The first portion 42 can be angularly oriented relative to the second portion 44. For example, an angle x (FIGS. 2, 5 and 8) can be defined between the first portion 42 and the second portion 44. In certain embodiments, the angle x can be less than 180 degrees and greater than 90 degrees for example. For example, the angle x can be approximately 135 degrees. In other embodiments, the angle x can be greater than 180 degrees or less than 90 degrees. Moreover, in various embodiments, the first portion 42 and the second portion 44 can be flexibly connected such that the angle x between the first portion 42 and the second portion 44 can vary and/or adjust. For example, a spring and/or hinge intermediate the first portion 42 and the second portion 44 can permit rotation of the second portion 44 relative to the first portion 42 depending on the opposing forces from the cover 30 and the covering apparatus 50, for example. In other embodiments, rotation between the first portion 42 and the second portion 44 can be restrained and/or prevented. Moreover, in various embodiments, the first portion 42 and the second portion 44 can be fixed at predefined lengths, for example, and can be non-adjustable. In still other embodiments, the first portion 42 and the second portion 44 can be extendable. For example, the second portion 44 can telescope within and/or relative to the first portion 42.

Referring now to FIGS. 15-25, the covering apparatus 50 can include a drive screw 52, which can have a first end portion 51 and a second end portion 53. The drive screw 52 can include threads 55 between the first end portion 51 and the second end portion 53. The covering apparatus 50 can also include a pair of brackets 60 and 62, for example. In certain embodiments, the first bracket 60 can hold and/or secure the first end portion 51 of the drive screw 52 and the second bracket 62 can hold and/or secure the second end portion 53 of the drive screw, such that the drive screw 52 extends between the brackets 60 and 62, for example. The brackets 60 and 62 can be configured to mount to the vehicle 20 (FIGS. 1-14), for example, to secure the covering apparatus 50 to the vehicle 20. In various embodiments, each bracket 60, 62 can include a plate 64a, 64b, and the drive screw 52 can extend between the plates 64a, 64b, for example. The plates 64a, 64b can each include an aperture 66 (FIG. 16) and, in various embodiments, the apertures 66 can have a bearing surface. The first end portion 51 and the second end portion 53 can be positioned within the apertures 66, for example, and can be configured to rotate along the bearing surface thereof.

In various embodiments, the covering apparatus 50 can also include at least one rail 80, which can extend between the brackets 60, 62. For example, each rail 80 can extend between the plates 64a, 64b, and can be parallel to the drive screw 52, for example. Moreover, the rail(s) 80 can be laterally offset from the drive screw 52 and, in various embodiments, can be positioned in-board of the drive screw 52. In certain embodiments, the covering apparatus 50 can include a single rail 80, and in other embodiments, the covering apparatus 50 can include two or more rails 80, for example. In certain embodiments, the drive screw 52 can be vertically intermediate a pair of rails 80. As described in greater detail herein, the rails 80 can be configured to guide a carriage 56 along at least a portion of the length of the drive screw 52, for example.

In certain embodiments, the covering apparatus 50 can also include a motor 70, which can be configured to drive the drive screw 52. For example, the motor 70 can be mounted to the drive screw 52 and/or to a coupling unit coupled to the drive screw 52, such that rotary output from the motor 70 is transferred to the drive screw 52. Moreover, in various embodiments, a controller 100 (FIG. 27) can be in signal communication with the motor 70, and can control the rotational output of the motor 70, for example. In various embodiments, the motor 70 can be an electric motor and, in other embodiments, the motor can be a hydraulic and/or hand-crank motor, for example.

In various embodiments, the covering apparatus 50 can further include the carriage 56, which can be configured to translate along the drive screw 52. For example, the carriage 56 can include an aperture having internal threads, which can engage the external threads of the drive screw 52. In various instances, the carriage 56 can include a nut 77 (FIGS. 19 and 21-24) having internal threads 79, for example, which can correspond to the external threads 55 of the drive shaft 52. The carriage 56 can also include a carriage body 74, and the nut 77 can be secured to the carriage body 74 by a plurality of bolts, screws, or other fasteners, for example. In such instances, rotation of the drive screw 52 can be configured to drive the nut 77 and the carriage 56 longitudinally between the first end portion 51 and the second end portion 53 thereof. In such instances, the position of the carriage 56 along the drive screw 52 can be adjusted to accommodate various different-sized containers, for example. As described in greater detail herein, the motor 70 and the controller 100 (FIG. 27) can control the position of the carriage 56 along the drive screw 52. In various embodiments, the thread pitch of the drive screw 52 and carriage 56 can be selected and/or designed to provide a suitable degree of precision and displacement speed of the carriage 56 along the drive screw 52.

Figure 18:
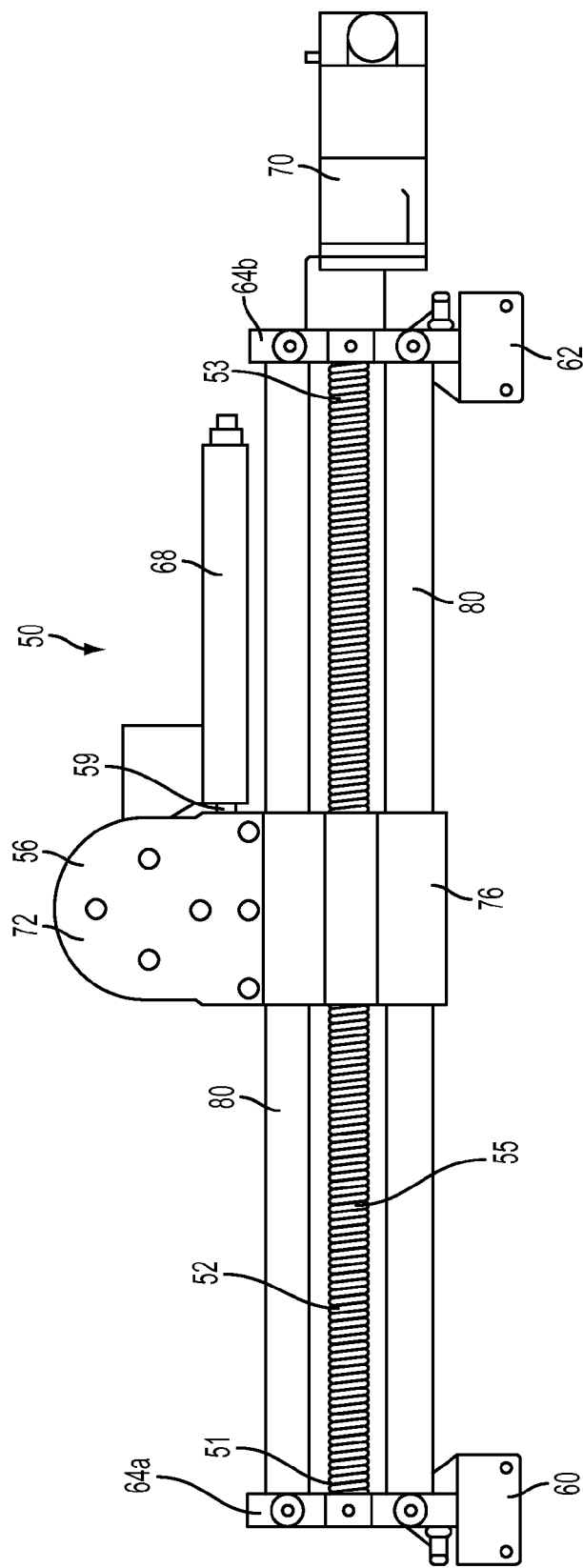
FIG. 18 is another elevation view of the covering apparatus of FIG. 15, according to various embodiments of the present disclosure.
Figure 19:
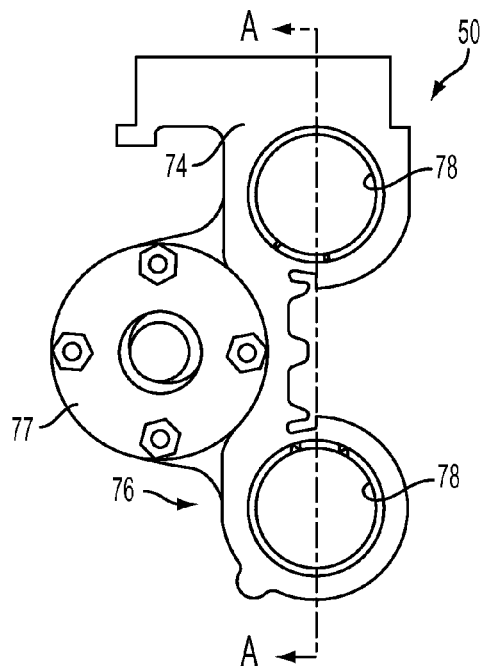
FIG. 19 is an elevation view of the carriage of the covering apparatus of FIG. 15 with various elements removed therefrom, according to various embodiments of the present disclosure.
Figure 20:
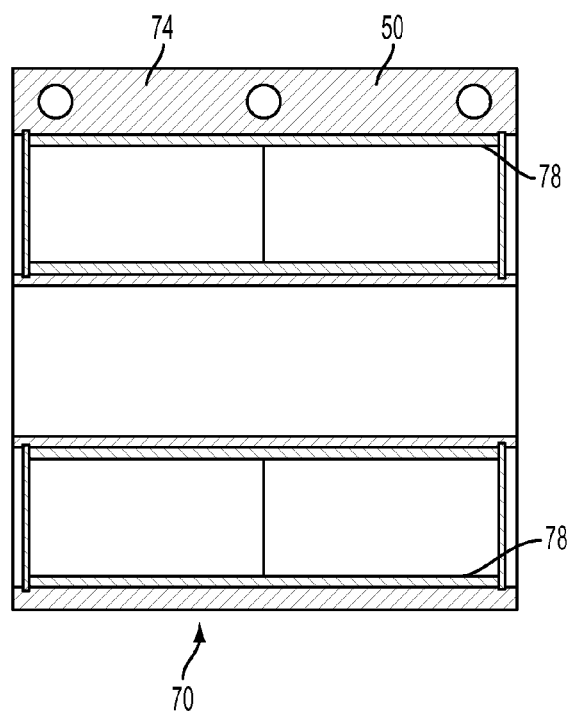
FIG. 20 is a cross-sectional elevation view of the carriage of the covering apparatus of FIG. 15 with various elements removed therefrom and taken along the plane A-A in FIG. 19, according to various embodiments of the present disclosure.
Figure 21:
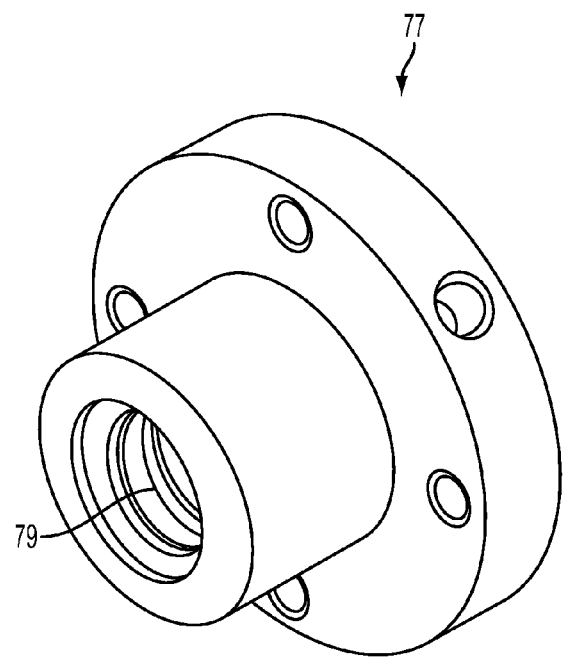
FIG. 21 is a perspective view of the nut of the carriage of FIG. 19, according to various embodiments of the present disclosure.
Figure 22:
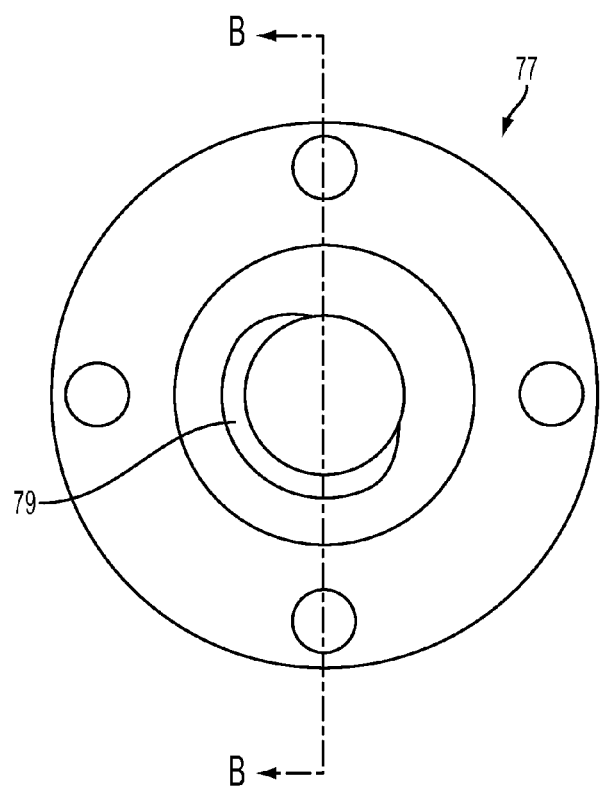
FIG. 22 is a plan view of the nut of FIG. 21, according to various embodiments of the present disclosure.
Figure 23:
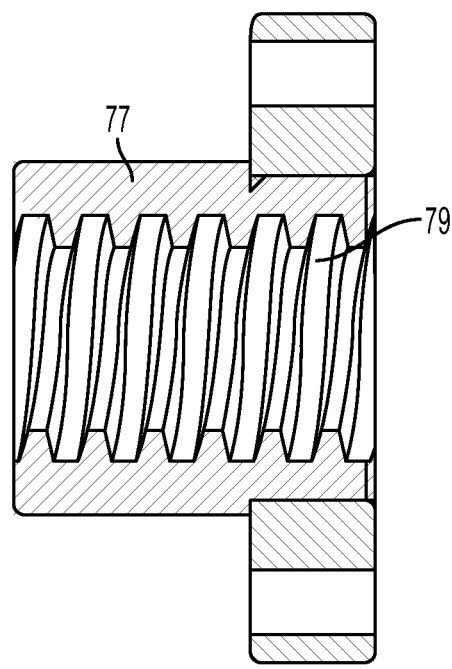
FIG. 23 is a cross-sectional elevation view of the nut of FIG. 21 taken along the plane B-B in FIG. 22, according to various embodiments of the present disclosure.

Referring still to FIGS. 15-18, the carriage 56 can include a spring 58, which can be mounted to the carriage 56. In certain embodiments, the spring 58 can be mounted to the carriage body 74. The spring 58 can be configured to extend the cover 30 along at least a portion of the length of the bed chassis 24. As described in greater detail herein, the cover 30 can be releasably wound around a motor-driven roller 32, which can operably unwind the cover 30 therefrom. As the cover 30 is unwound from the roller 32, the spring 58 of the covering apparatus 50 can pull the cover 30. For example, the spring 58 can include a first end 57 (FIG. 16) and a second end 59 (FIG. 18). In certain embodiments, the first end 57 can be secured and/or fixed to the carriage body 74, and the second end 59 can be configured to rotate relative to the carriage body 74. The second end 59 can be attached and/or fixed to an attachment member 68, for example. In various embodiments, the attachment member 68 can be configured to be fastened to the cover 30 via one of the arms 40, such that movement of the second end 59 affects pivoting of the attached arm 40, for example. Moreover, in certain embodiments, the spring 58 can be a spiral or torsion spring, which can generate a rotational bias, and can be configured to transfer the rotational bias to the arm 40 via the attachment member 68, for example. The reader will appreciate that the spring 58 can be designed and selected to provide a suitable resistance to rotation and/or tension in the cover 30.

In various embodiments, the carriage 56 can include a pair of carriage plates 72 extending from the carriage body 74, for example, and the spring 58 can be sandwiched and/or held between the plates 72. The carriage 56 can also include a sliding portion 76. In certain embodiments, the sliding portion 76 can extend from the carriage body 74 opposite the carriage plates 72, for example. Moreover, the sliding portion 76 can include at least one aperture 78. In various embodiments, the aperture(s) 78 in the sliding portion 76 can include a bearing surface defined into the sliding portion 76. A rail 80 can be received in the aperture 78, for example, such that the sliding portion 76 can slide over the rail 80. In various embodiments, each rail 80 can be received in an aperture 78 and/or each aperture 78 can slidably engage a rail 80, for example. As the drive screw 52 rotates, the rails 80 can prevent rotation of the carriage 56, such that rotation of the drive screw 52 actuates linear translation of the carriage 56 along the drive screw 52 and the rails 80, for example.

In various instances, the covering apparatus 50 can be mounted to the chassis 24 of the vehicle 20. For example, referring again to FIGS. 1-14, the brackets 60 and 62 can be mounted to a fender 90 and/or a fender mount 92. For example, the chassis 24 can include a fender 90, and the fender mount 92 can be fastened to and/or integrally formed with the fender 90, for example. In various embodiments, the fender mount 92 can include a longitudinal rod or support 94, which can be oriented longitudinally along a side of the chassis 24. For example, the longitudinal support 94 can be supported and/or fastened to the fender 90, and can support and/or hold the covering apparatus 50. In certain embodiments, the brackets 60 and 62 can be bolted or otherwise fastened to the longitudinal support 94, for example. In other embodiments, the brackets 60 can be fastened to the fender 90 and/or another element or elements of the chassis 24. In various instances, the placement of the covering apparatus 50 relative to the chassis can be determined by the dimensions of the container, for example. For example, the chassis 24 can include a plurality of predefined fastener holes, for example, which can be structured and positioned to receive fasteners to attach the covering apparatus 50 thereto. For example, the longitudinal support 94 can have a plurality of fasteners holes defined therein, and the fastener holes can be configured to receive fasteners to attach the covering apparatus to the longitudinal support 94 at the intended and predefined position. In various instances, though the placement of the covering apparatus 50 relative to the chassis 24 can be predetermined or fixed, the covering apparatus 50 can be adjustable, such that the cover 30 can be adapted to cover different sized containers.

Figure 26:
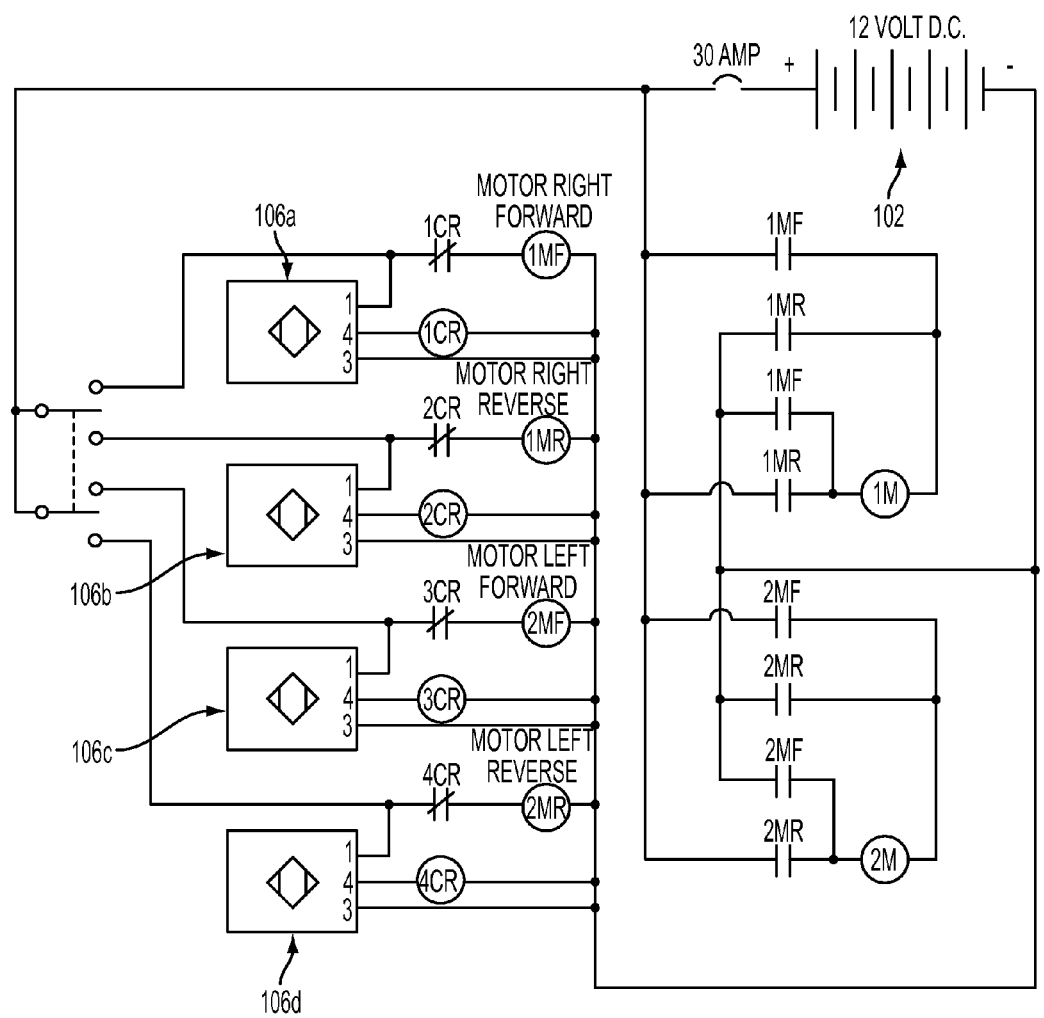
FIG. 26 is a schematic of a control circuit for a covering apparatus, according to various embodiments of the present disclosure.
Figure 27:
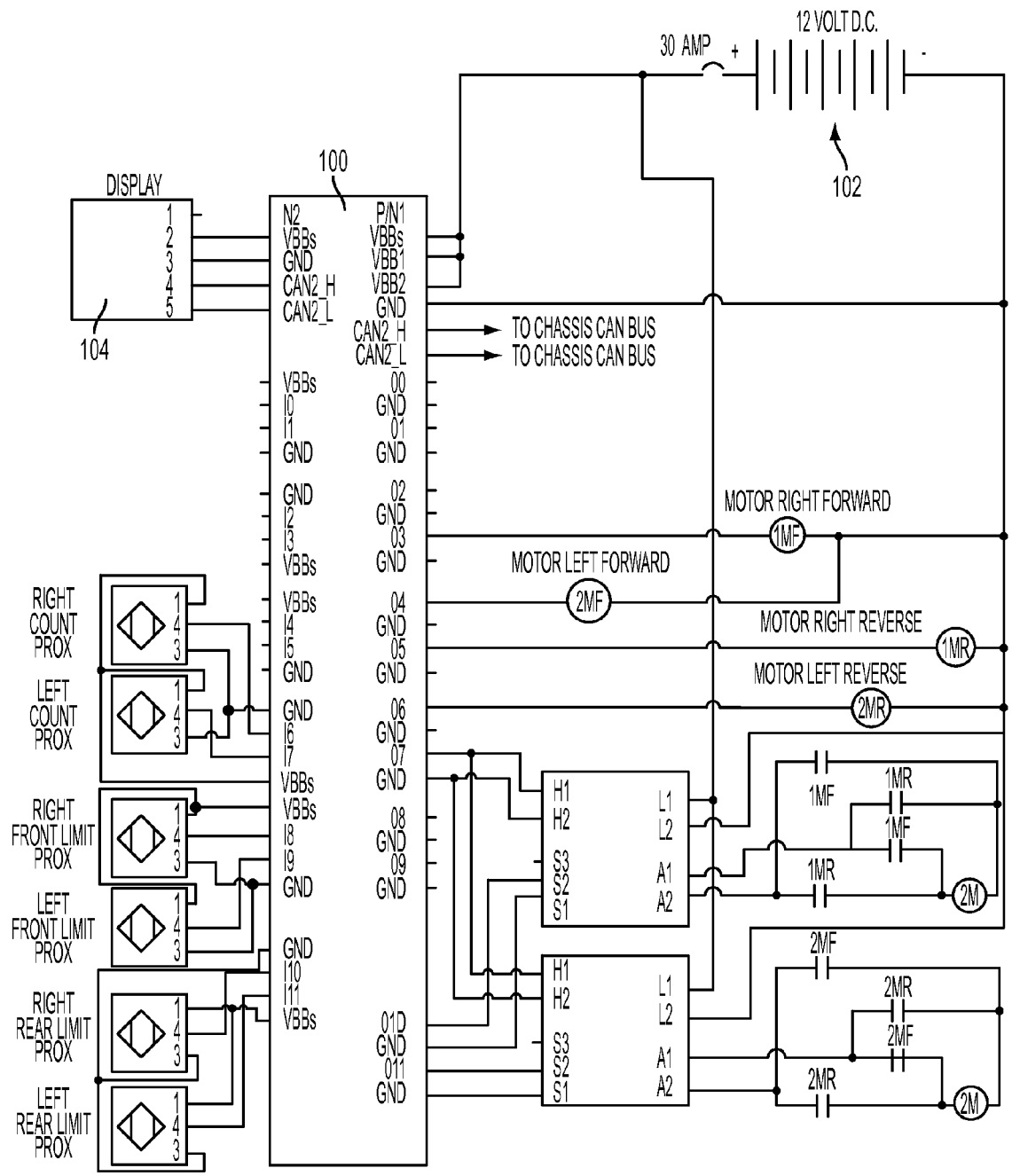
FIG. 27 is another schematic of a control circuit for a covering apparatus, according to various embodiments of the present disclosure.

Referring now to FIGS. 26 and 27, a control system for the covering apparatus 50 can include a controller or circuit board 100, which can control operation of the motor or motors 70. In various embodiments, the controller 100 can include a plurality of I/O pins, which can be coupled to counters and/or limit switches for controlling operation and/or output characteristics of the motor(s) 70. For example, the controller 100 can be coupled to a pair of motors 70, such as a first motor on a first lateral side of the chassis 24 (FIGS. 1-14) and a second motor on a second lateral side of the chassis 24. In various embodiments, referring to FIG. 14, a plurality of switches 106a, 106b, 106c, and 106d can control the rotational direction of the motors 70. The control system can further include a battery 102 and/or a display 104 (FIG. 27), which can provide feedback to the operator and/or accept input and/or directives from the operator.

Figure 2:
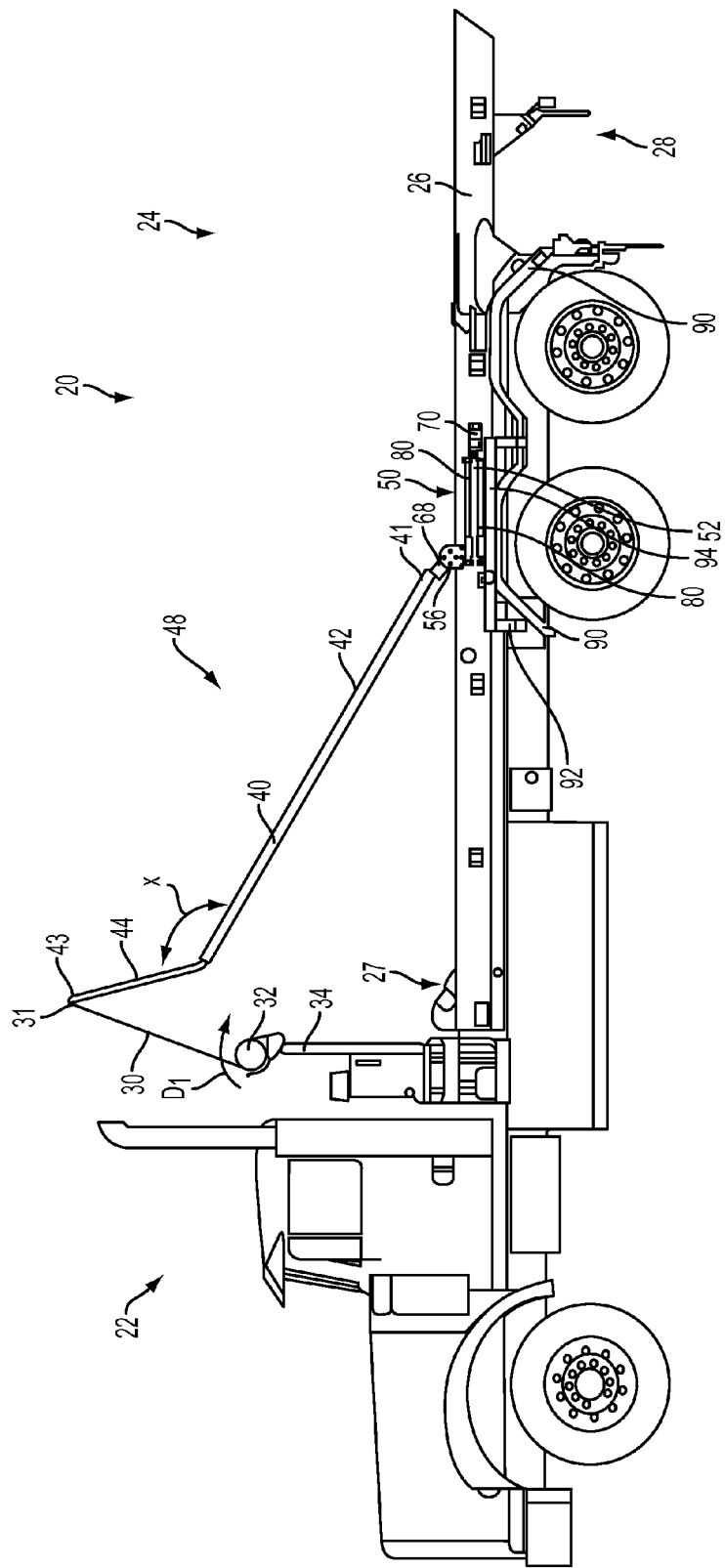
FIG. 2 is an elevation view of the truck and the covering apparatus of FIG. 1, depicting the covering apparatus in the first configuration, according to various embodiments of the present disclosure.
Figure 3:
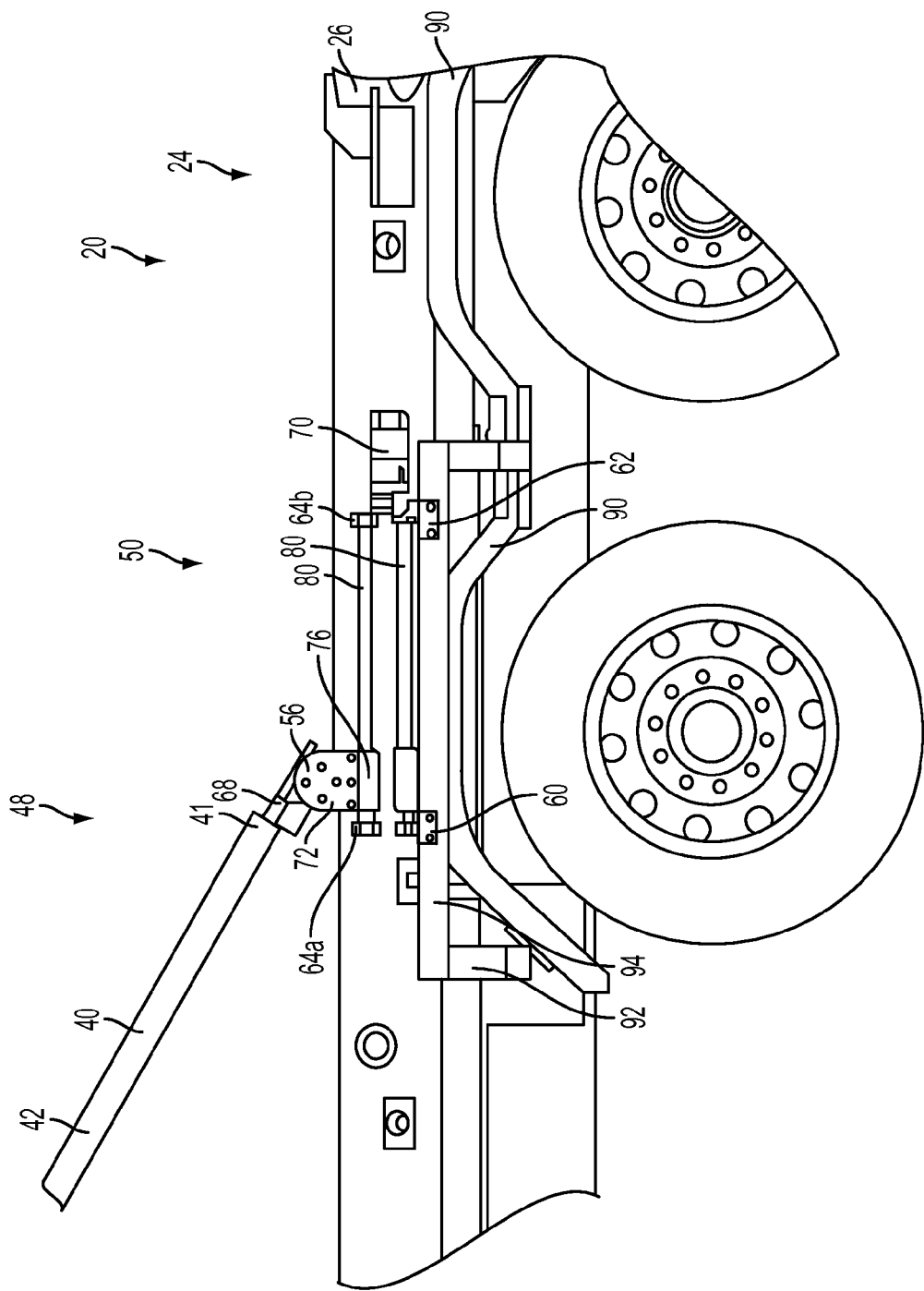
FIG. 3 is a partial elevation view of the truck and the covering apparatus of FIG. 1, depicting the covering apparatus in the first configuration, according to various embodiments of the present disclosure.

In various instances, the covering apparatus 50 can be deployed to adjustably extend the cover 30 over a container 25 (FIGS. 10, 13 and 14) on the vehicle 20 and to operably retract the cover 30 from over the container 25. For example, referring to FIGS. 1-3, the covering apparatus 50 can initially be in a first position, in which the carriage 56 is positioned at and/or near the first end portion 51 of the drive shaft 52, which can be closer to the cab 22 of the vehicle 20 than the second end portion 53. Moreover, at least a portion of the cover 30 can be wound around the roller 32. In various instances, the roller motor 38 can initiate rotation of the roller 32 in a first direction $D_1$ (FIG. 10), which can release a length of the cover 30 from the roller 32. In such instances, the spring bias of the spring 58 in the carriage 56 can pivot the arm 40 in the first direction $D_1$, which can extend the cover 30 toward the second end 28 of the bed 26. The reader will appreciate that though the configuration depicted in FIGS. 1-3 is referred to as the first position, the covering apparatus 50 can be oriented in a different position prior to the first position. For example, the cover 30 can be further retracted to pivot the arm assembly 48 opposite to the first direction $D_1$ and toward the cab 22 of the vehicle 20, for example. In such instances, the configuration depicted in FIGS. 1-3 can be a partially deployed and/or partially extended configuration, for example.

Figure 4:
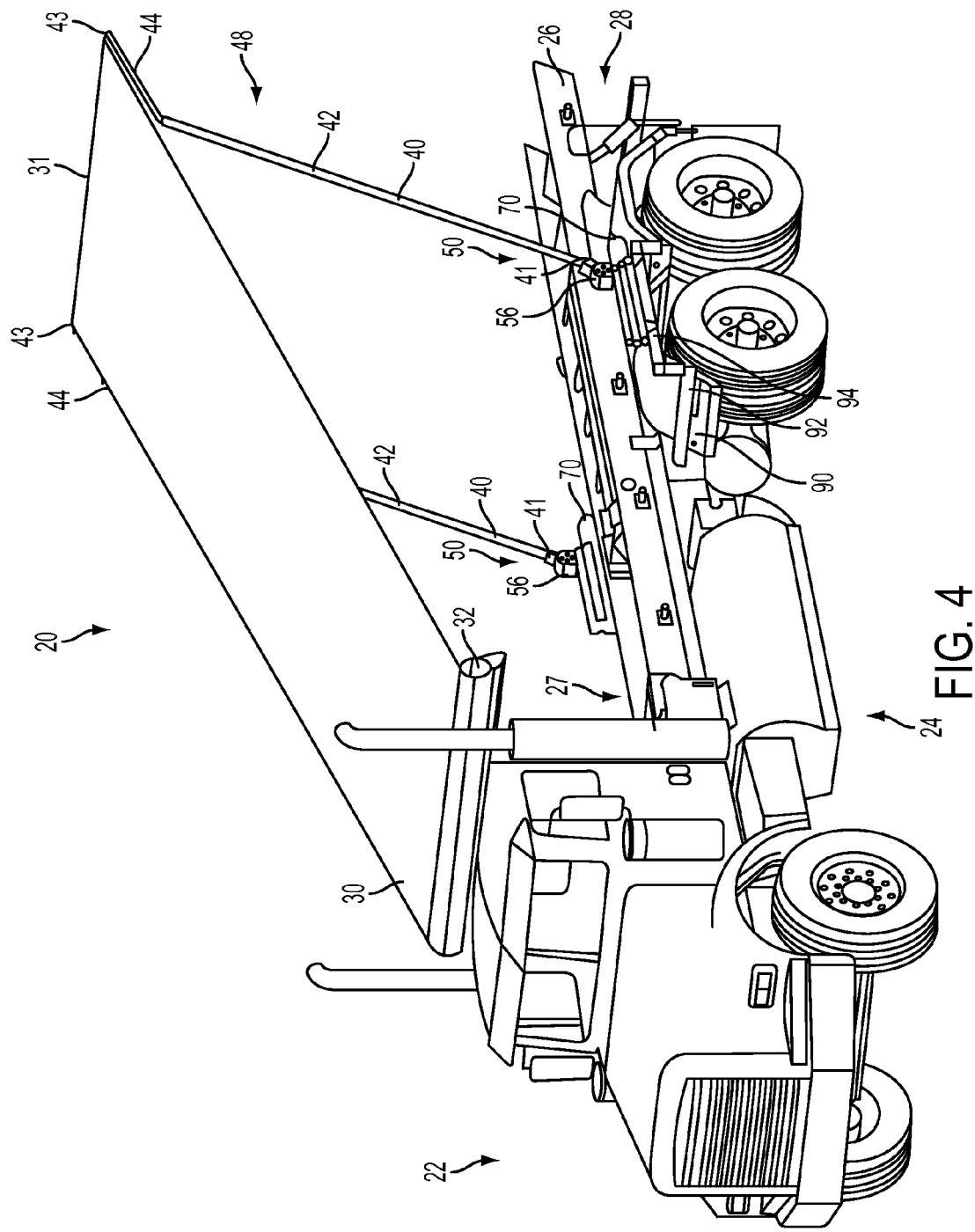
FIG. 4 is a perspective view of the truck and the covering apparatus of FIG. 1, depicting the covering apparatus in a partially deployed configuration, according to various embodiments of the present disclosure.
Figure 5:
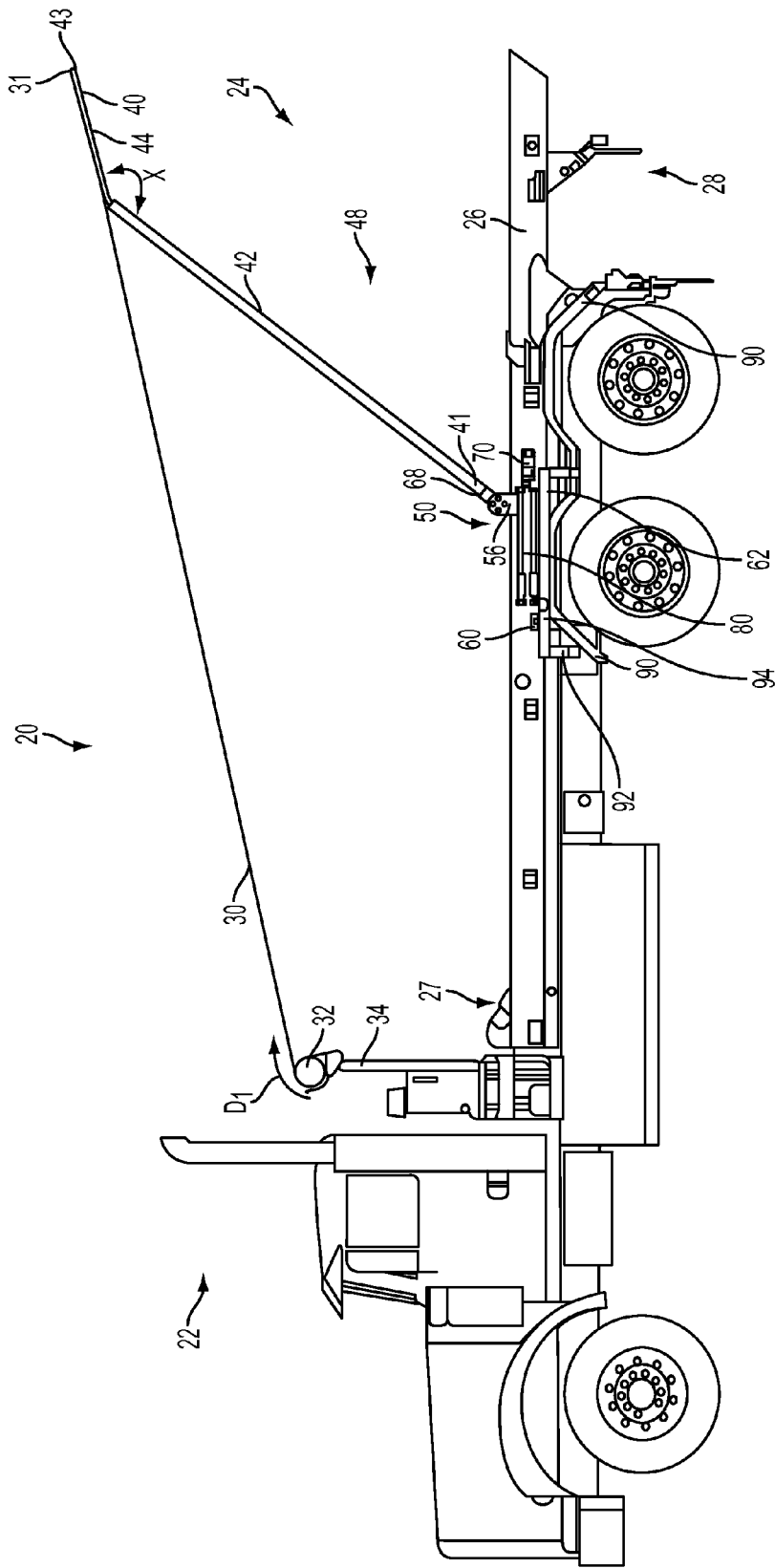
FIG. 5 is an elevation view of the truck and the covering apparatus of FIG. 1, depicting the covering apparatus in the partially deployed configuration, according to various embodiments of the present disclosure.
Figure 6:
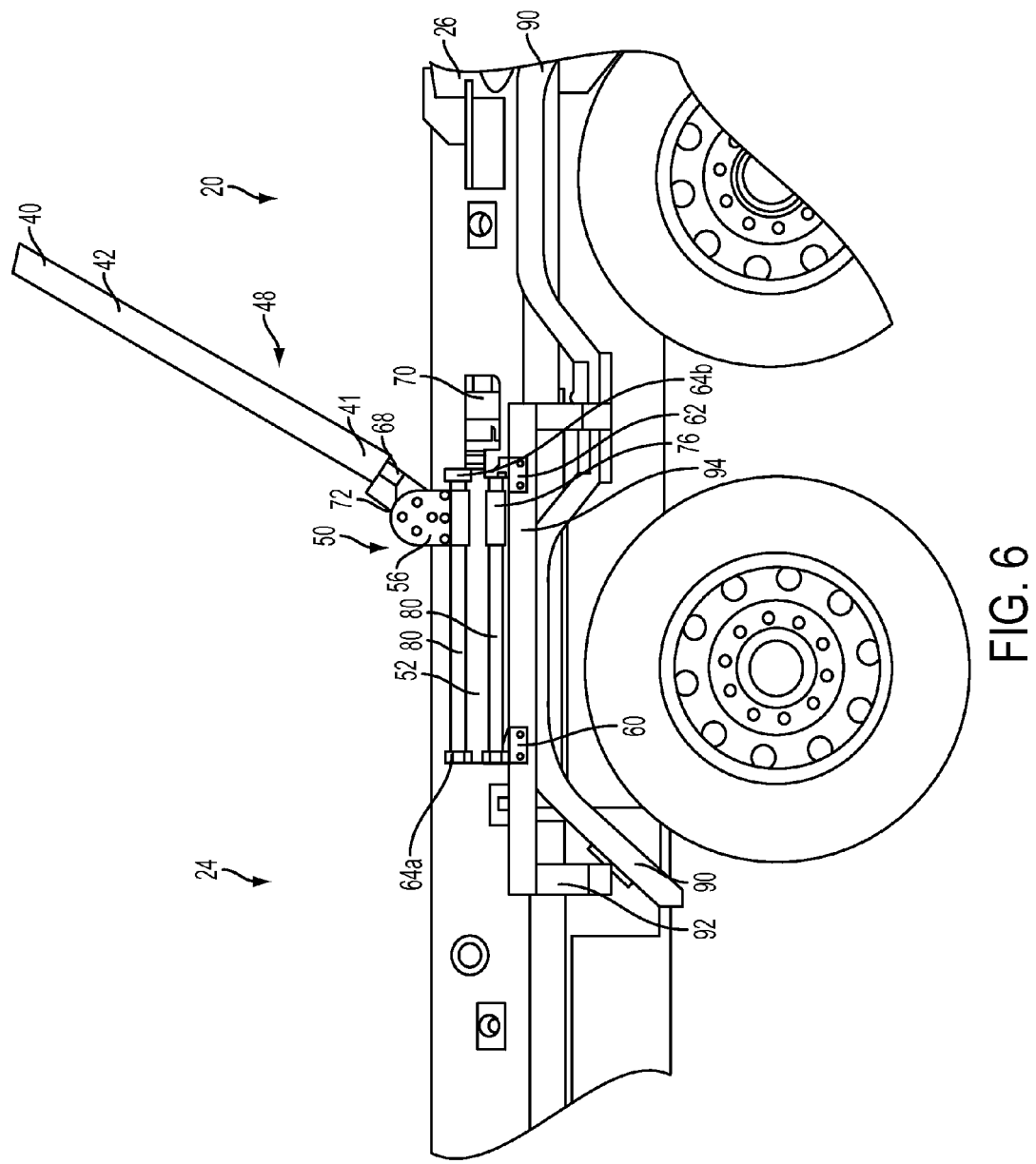
FIG. 6 is a partial elevation view of the truck and the covering apparatus of FIG. 1, depicting the covering apparatus in the partially deployed configuration, according to various embodiments of the present disclosure.

Referring now to FIGS. 4-6, in various instances, the motor 70 can be actuated to rotate the drive shaft 52 and affect translation of the carriage 56 toward the second end portion 53 of the drive shaft 52. Depending on the dimensions of the container positioned on the bed 26, the carriage 56 can be moved to the second end portion 53 and/or to a position between the first end portion 51 and the second end portion 52. In instances where the container is longer, for example, the carriage 56 may be moved to the second end portion 53 and, in instances where the container is shorter, for example, the carriage may be moved between the first end portion 51 and the second end portion 52 or remain at and/or near the first end portion 51, for example. Moreover, the roller motor 38 can continue to rotate the roller 32 in the first direction (FIG. 5), which can continue to release or unwind the cover 30 from the roller 32. In such instances, the bias of the spring 58 in the carriage 56 can continue to pivot the arm 40 in the first direction $D_1$, which can continue to extend the cover 30 toward the second end 28 of the bed 26.

Figure 11:
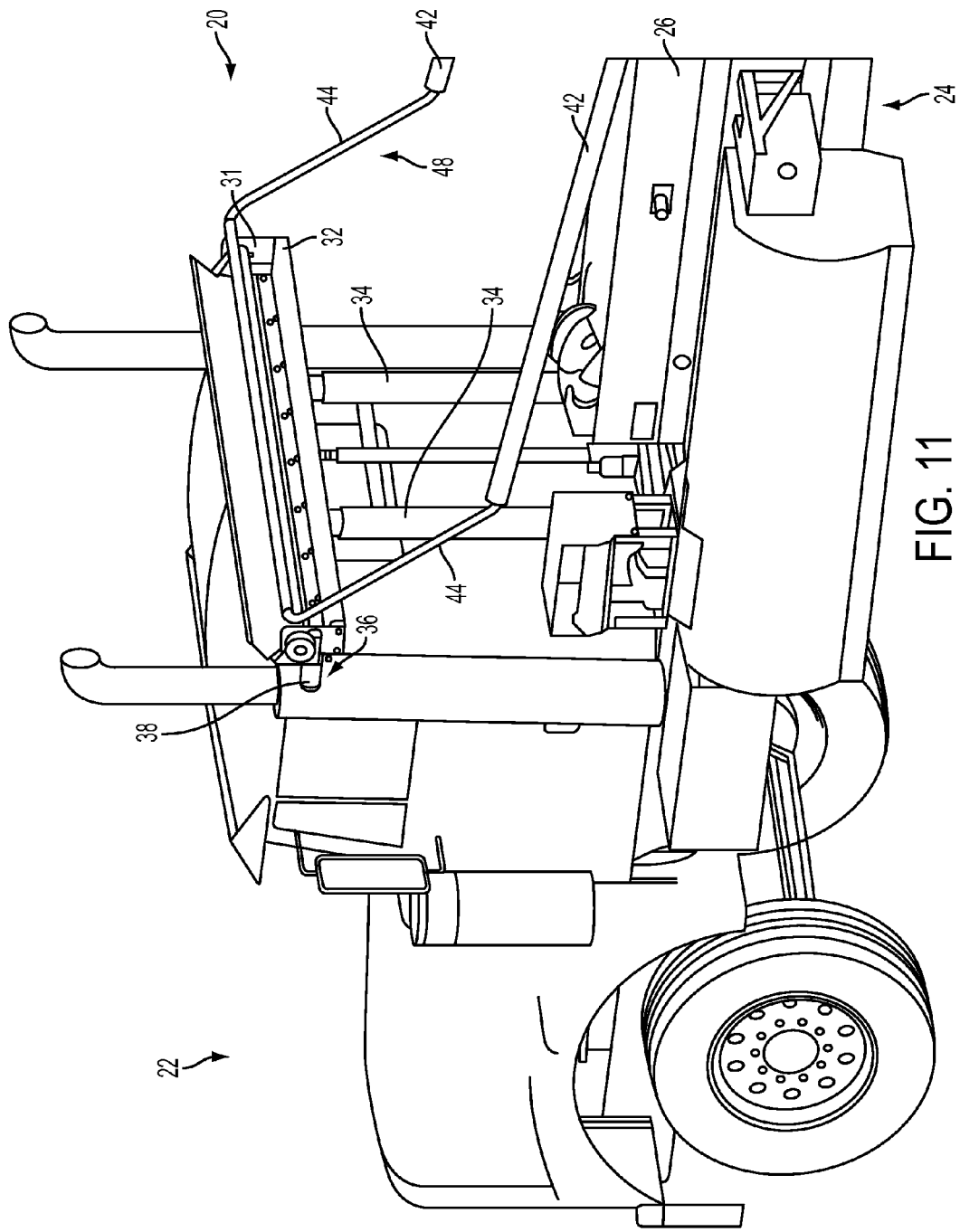
FIG. 11 is an elevation view of the truck and the covering apparatus of FIG. 1, depicting the covering apparatus in the retracted configuration, according to various embodiments of the present disclosure.
Figure 12:
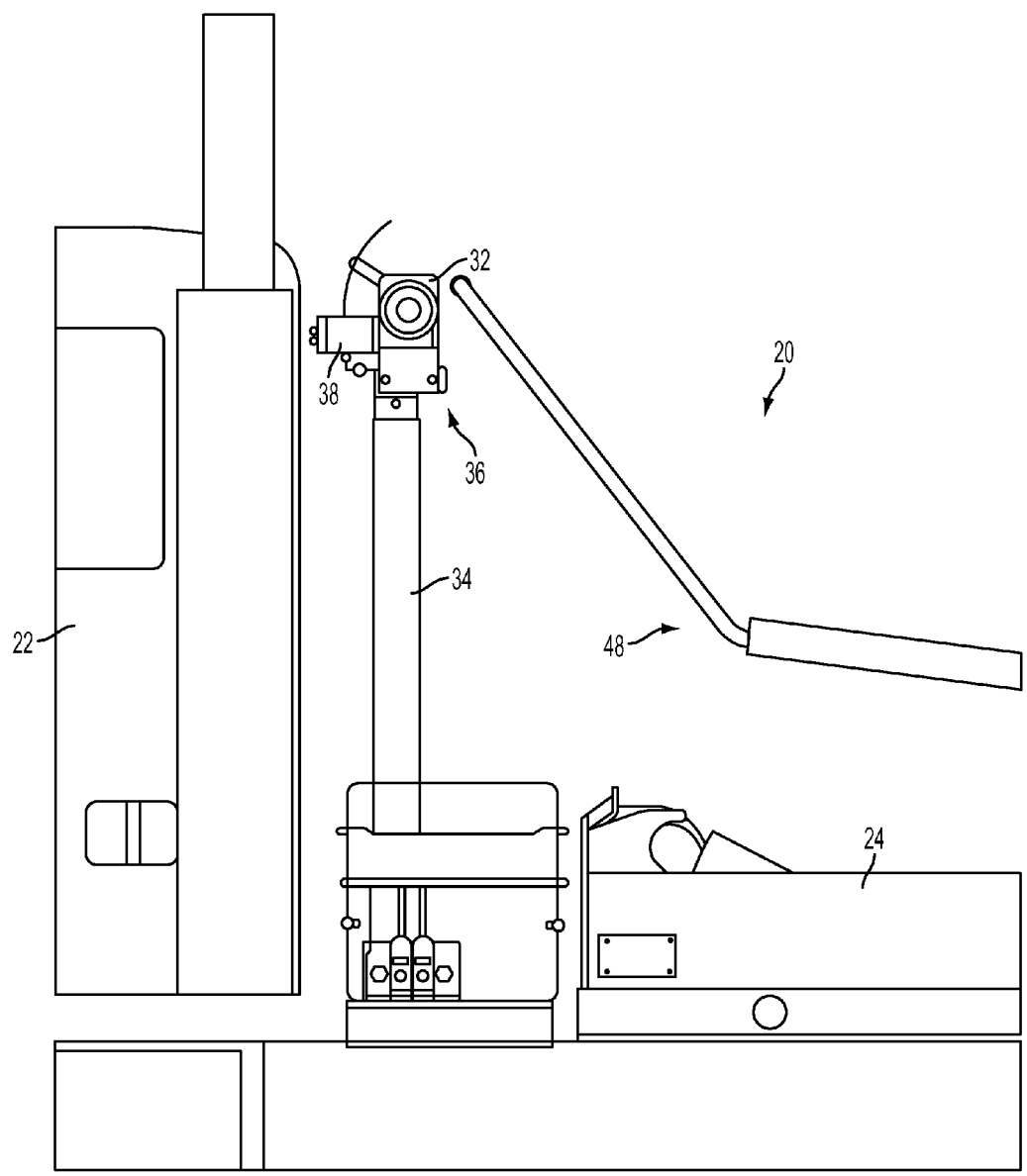
FIG. 12 is a partial elevation view of the truck and the covering apparatus of FIG. 1, depicting the covering apparatus in the retracted configuration, according to various embodiments of the present disclosure.

Referring now to FIGS. 11-13, the roller motor 38 can continue to rotate the roller 32 in the first direction $D_1$ (FIG. 5), which can continue to release or unwind the cover 30 from the roller 32. In such instances, the bias of the spring 58 in the carriage 56 can continue to pivot the arm 40 in the first direction $D_1$ (FIG. 5), which can continue to extend the cover 30 toward the second end 28 of the bed 26. In various instances, the motor 70 can be actuated to rotate the drive shaft 52 and affect translation of the carriage 56 toward the first end portion 51 of the drive shaft 52. In other instances, the carriage 56 can remain at the second end portion 53 of the drive shaft 52.

Figure 7:
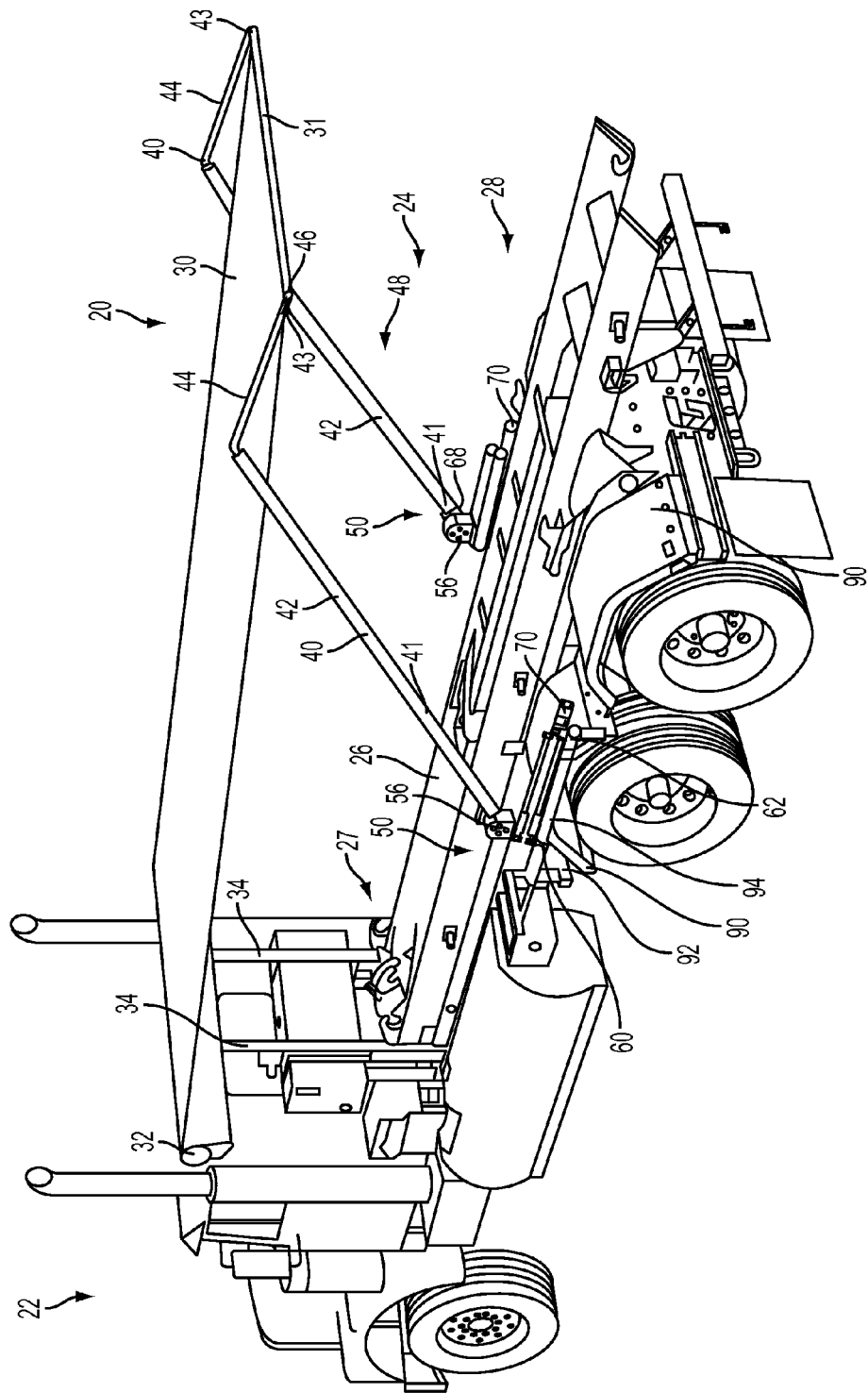
FIG. 7 is a perspective view of the truck and the covering apparatus of FIG. 1, depicting the covering apparatus in an extended configuration, according to various embodiments of the present disclosure.
Figure 8:
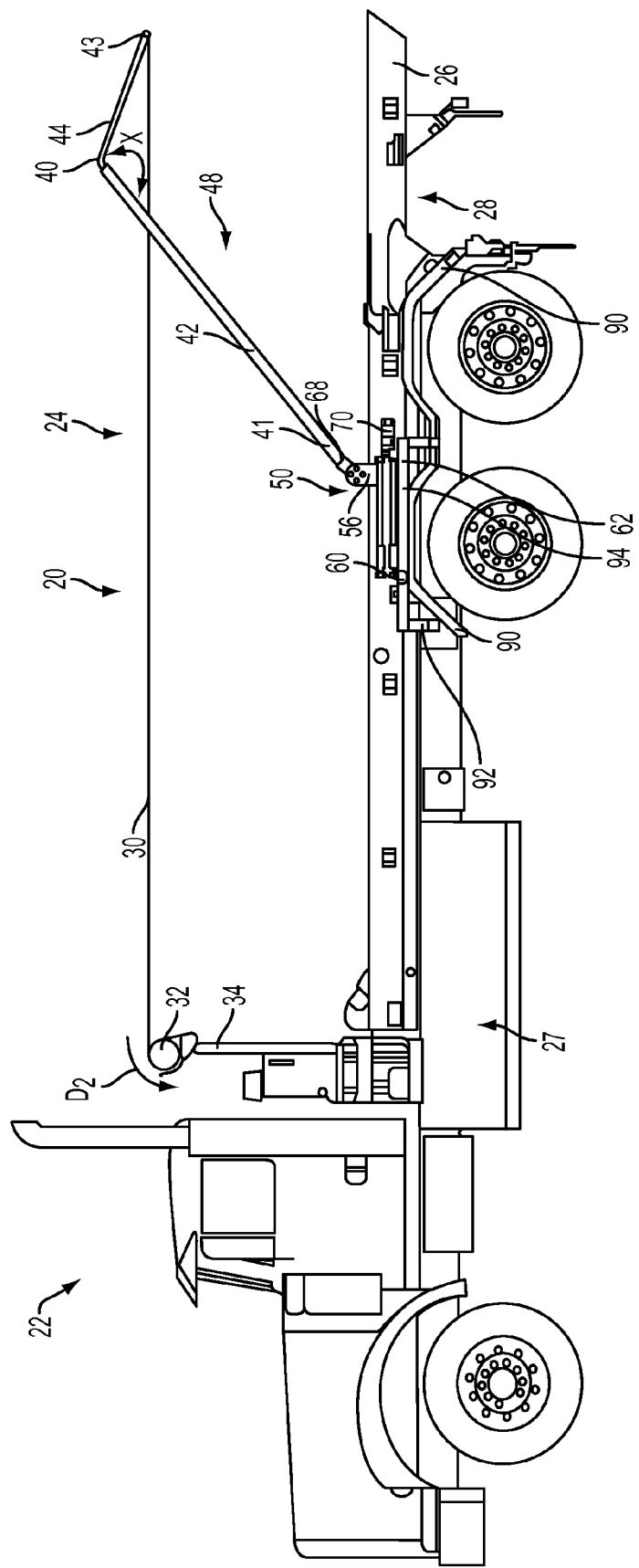
FIG. 8 is an elevation view of the truck and the covering apparatus of FIG. 1, depicting the covering apparatus in the extended configuration, according to various embodiments of the present disclosure.
Figure 9:
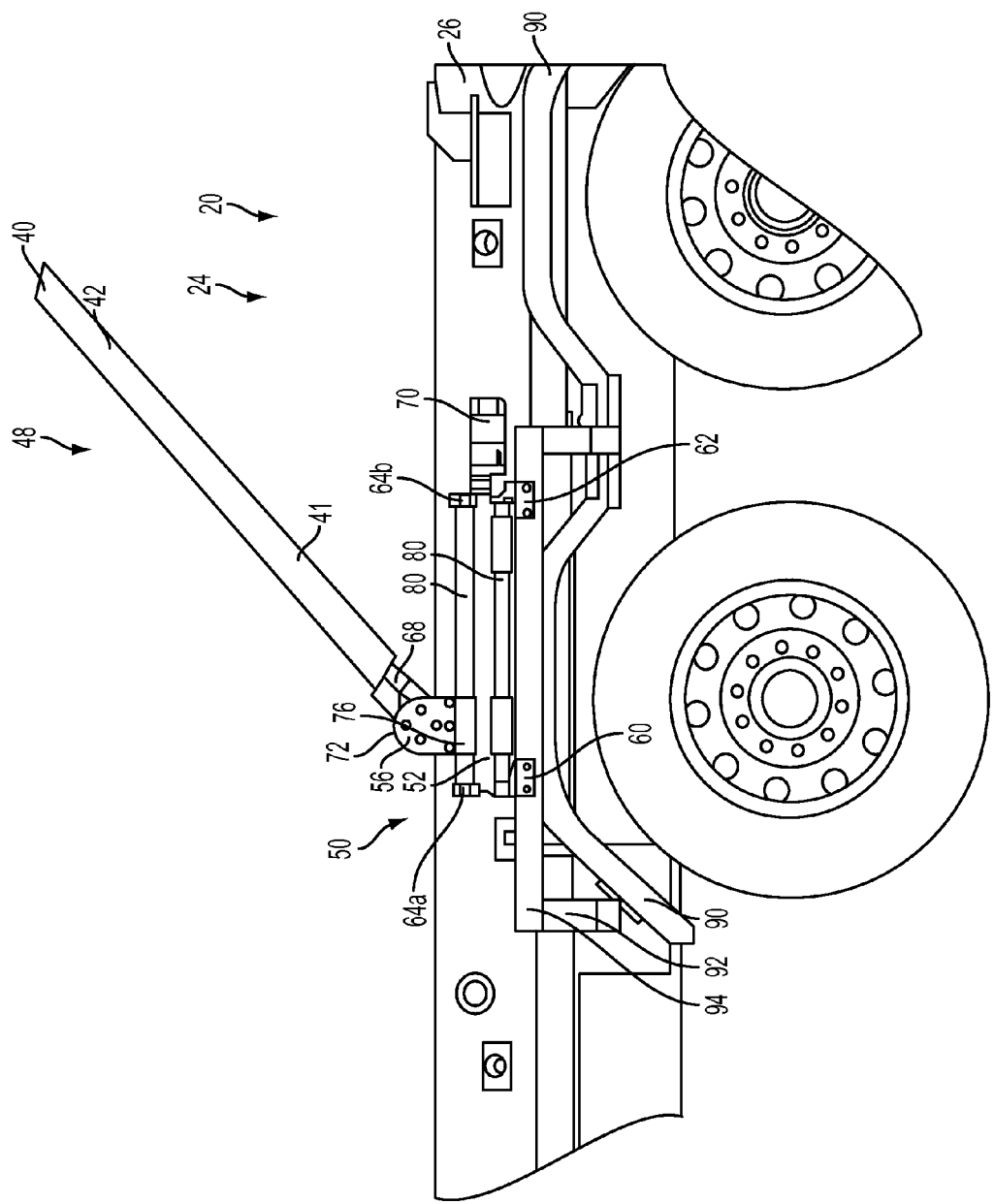
FIG. 9 is a partial elevation view of the truck and the covering apparatus of FIG. 1, depicting the covering apparatus in the extended configuration, according to various embodiments of the present disclosure.

Referring still to FIGS. 7-9, in various instances, the roller motor 38 can initiate rotation of the roller 32 in a second direction $D_2$ (FIG. 8), which can rewind a length of the cover 30 onto the roller 32. In such instances, the roller motor 38 can overcome the force of the spring 58 in the carriage 56 to pivot the arm 40 in the second direction $D_2$, which can retract the cover 30 toward the first end 27 of the bed 26. In such instances, the roller motor 38 can continue to retract the cover 30 through the intermediate configuration (FIGS. 4-6) and to the first configuration (FIGS. 1-3). In various instances, the roller motor 38 can continue to retract the cover 30 and pivot the arm assembly 48 toward the cab 22 of the vehicle 20, for example. In various instances, the posts 34 can be retracted toward the deck 26 upon completion of the deployment cycle of the cover 30, for example.

Though various configurations and orientations of the covering apparatus 50, cover 30, and posts 34 are depicted in the accompanying figures, the reader will appreciate the range of motion provided by the disclosed system. For example, the length of the drive screw 52 and the position thereof along the length of the chassis 24 can be designed and selected to provide a suitable range of motion for covering a variety of different sized container. Moreover, the spring 58 can be designed and selected to provide the suitable degree of rotation for covering a variety of different sized containers and with a predefined spring constant to provide a suitable resistance to rotation and tension in the cover 30. Moreover, in certain embodiments, the posts 34 can be designed and selected to provide the suitable height adjustability for covering a variety of different sized containers.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While this invention has been described as having exemplary designs, the present invention may be further modified within the spirit and scope of the disclosure. This application is therefore intended to cover any variations, uses, or adaptations of the invention using its general principles. Further, this application is intended to cover such departures from the present disclosure as come within known or customary practice in the art to which this invention pertains.

I claim:

1. An apparatus for moving a cover over a bed of a vehicle, the apparatus comprising:
   a longitudinal drive screw;
   a motor coupled to the longitudinal drive screw;
   a longitudinally translatable carriage threadably engaged with the longitudinal drive screw, wherein the longitudinally translatable carriage comprises a spring-loaded attachment element, and wherein the longitudinally translatable carriage is configured to translate along the longitudinal drive screw; and
   an arm mounted to the spring-loaded attachment element, wherein the arm is configured to pivot relative to the longitudinally translatable carriage;
   wherein the longitudinally translatable carriage comprises a coil spring.

2. The apparatus of claim 1, wherein the apparatus comprises a first bracket and a second bracket, and wherein the brackets are configured to mount to an attachment element fastened to a fender of the vehicle.

3. The apparatus of claim 2, further comprising a plurality of rails parallel to the longitudinal drive screw, wherein the rails and the longitudinal drive screw extend between the first bracket and the second bracket.

4. The apparatus of claim 1, further comprising:
   the cover; and
   a motor for operably extending and retracting the cover.

5. A vehicle, comprising:
   a chassis;
   an extendable cover;
   an actuator mounted to the chassis, wherein the actuator comprises:
     a longitudinal drive screw;
     a motor coupled to the longitudinal drive screw; and
     a longitudinally translatable carriage threadably engaged with the longitudinal drive screw, wherein the longitudinally translatable carriage comprises a spring having a first end and a second end, and wherein the first end is fixed to the longitudinally translatable carriage; and
   an arm mounted to the second end of the spring, wherein the arm comprises an attachment portion attached to the extendable cover;
   wherein an aperture is defined in the longitudinally translatable carriage, and wherein the actuator further comprises a rail oriented parallel to the longitudinal drive screw and extending axially through the aperture.

6. The vehicle of claim 5, wherein the arm is configured to pivot relative to the longitudinally translatable carriage, and wherein the longitudinally translatable carriage is configured to translate along the longitudinal drive screw.

7. The vehicle of claim 5, wherein the actuator further comprises a first bracket fixed to the chassis and a second bracket fixed to the chassis, and wherein the longitudinal drive screw extends between the first bracket and the second bracket.

8. The vehicle of claim 5, wherein the spring comprises a torsion spring.

9. The vehicle of claim 5, wherein the longitudinally translatable carriage is configured to slide along the rail.

10. The vehicle of claim 9, wherein a second aperture is defined in the longitudinally translatable carriage, and wherein the actuator further comprises a second rail oriented parallel to the longitudinal drive screw and extending axially through the second aperture.

11. The vehicle of claim 10, wherein the rails are laterally offset from the longitudinal drive screw.

12. The vehicle of claim 10, wherein the actuator further comprises a first bracket mounted to the chassis and a second bracket mounted to the chassis, and wherein the rails extend between the first bracket and the second bracket.

13. The vehicle of claim 5, further comprising an open container supported by the chassis, wherein the extendable cover is configured to adjustably cover the open container.

14. The vehicle of claim 5, wherein the chassis further comprises:
a fender; and
an attachment portion mounted to the fender, wherein the actuator is mounted to the attachment portion.

15. A vehicle, comprising:
a chassis;
an extendable cover;
an actuator mounted to the chassis, wherein the actuator comprises:
a longitudinal drive screw;
a motor coupled to the longitudinal drive screw; and
a longitudinally translatable carriage threadably engaged with the longitudinal drive screw, wherein the longitudinally translatable carriage comprises a spring having a first end and a second end, and wherein the first end is fixed to the longitudinally translatable carriage;
an arm mounted to the second end of the spring, wherein the arm comprises an attachment portion attached to the extendable cover;
a second actuator, comprising:
a second longitudinal drive screw;
a second motor coupled to the second longitudinal drive screw; and
a second longitudinally translatable carriage threadably engaged with the second longitudinal drive screw, wherein the second longitudinally translatable carriage comprises a second spring having a first end and a second end, and wherein the first end of the second spring is fixed to the second longitudinally translatable carriage; and
wherein the arm is further mounted to the second end of the second spring.

16. The vehicle of claim 15, wherein the arm comprises:
a first portion;
a second portion; and
a transverse member connecting the first portion and the second portion.

17. The vehicle of claim 15, wherein the longitudinal drive screws are mounted to opposite sides of the chassis.

* * * * *